US007274706B1

(12) United States Patent
Nguyen et al.

(10) Patent No.: US 7,274,706 B1

(45) Date of Patent: Sep. 25, 2007

(54) METHODS AND SYSTEMS FOR PROCESSING NETWORK DATA

(75) Inventors: Tung Nguyen, Cupertino, CA (US); Fong Pong, Mountain View, CA (US); Paul Jordan, Austin, TX (US); Syrus Ziai, Sunnyvale, CA (US); Al Chang, Yorktown Heights, NY (US); Greg Grohoski, Austin, TX (US)

(73) Assignee: Syrus Ziai, Sunnyvale, CA (US)

( * ) Notice: Subject to any disclaimer, the term of this patent is extended or adjusted under 35 U.S.C. 154(b) by 976 days.

(21) Appl. No.: 09/841,943

(22) Filed: Apr. 24, 2001

(51) Int. Cl.

| | |
|---|---|
| ***H04L 12/28*** | (2006.01) |
| ***H04L 12/56*** | (2006.01) |
| ***H04L 12/66*** | (2006.01) |
| ***H04J 3/16*** | (2006.01) |
| ***H04J 3/22*** | (2006.01) |

(52) U.S. Cl. ....................... 370/419; 370/463; 370/469

(58) Field of Classification Search ................ 370/419, 370/466, 469, 474; 709/224, 226, 235, 249
See application file for complete search history.

(56) References Cited

U.S. PATENT DOCUMENTS 4,991,133 A 2/1991 Davis et al.
5,206,935 A * 4/1993 Sinks et al. .................... 710/29
5,222,217 A * 6/1993 Blount et al. ............... 707/204
5,430,842 A 7/1995 Thompson et al.
5,500,864 A 3/1996 Gonia et al.
5,638,370 A 6/1997 Seconi et al.
5,790,786 A 8/1998 Wakeman et al.
5,826,032 A 10/1998 Finn et al.
5,898,713 A 4/1999 Melzer et al.
5,937,169 A 8/1999 Connery et al.
6,032,253 A 2/2000 Cashman et al.
6,119,170 A * 9/2000 Schoffelman et al. ....... 709/244
6,173,333 B1 1/2001 Jolitz et al.
6,226,680 B1 5/2001 Boucher et al.
6,226,771 B1 5/2001 Hilla et al.
6,247,060 B1 6/2001 Boucher et al.
6,279,140 B1 8/2001 Slane
6,289,023 B1 9/2001 Dowling et al.
6,310,884 B1 10/2001 Odenwald, Jr.
6,345,302 B1 2/2002 Bennett et al.
6,389,468 B1 * 5/2002 Muller et al. ............... 709/226
6,389,479 B1 5/2002 Boucher et al.
6,427,171 B1 7/2002 Craft et al.

(Continued)

OTHER PUBLICATIONS

A. Rijsinghani, "*Computation of the Internet Checksum Via Incremental Update*", Network Working Group, Update 1141, Informational Category, May 1994, pp. 1-6. Printed from http://www.tools.ietf.org/rfc/rfc, 1624.txt.

*Primary Examiner*—Daniel Ryman
(74) *Attorney, Agent, or Firm*—Blakely, Sokoloff, Taylor & Zafman LLP

(57) ABSTRACT

Methods and systems for processing data communicated over a network. In one aspect, an exemplary embodiment includes processing a first group of network packets in a first processor which executes a first network protocol stack, where the first group of network packets are communicated through a first network interface port, and processing a second group of network packets in a second processor which executes a second network protocol stack, where the second group of network packets is communicated through the first network interface port. Other methods and systems are also described.

6 Claims, 30 Drawing Sheets

U.S. PATENT DOCUMENTS 6,427,173 B1 7/2002 Boucher et al.
6,434,620 B1 8/2002 Boucher et al.
6,470,415 B1 10/2002 Starr et al.
6,513,108 B1 * 1/2003 Kerr et al. .................... 712/19
6,530,061 B1 3/2003 Labatte
6,629,288 B1 9/2003 Bernath et al.
6,631,488 B1 10/2003 Stambaugh et al.
6,647,528 B1 11/2003 Collette et al.
6,735,773 B1 * 5/2004 Trinh et al. ................. 719/328
2002/0107962 A1 * 8/2002 Richter et al. .............. 709/225

* cited by examiner

Local Area Network (LAN) Abstract View

FIG. 2 (Prior Art) Data Encapsulation Through The Network Stack

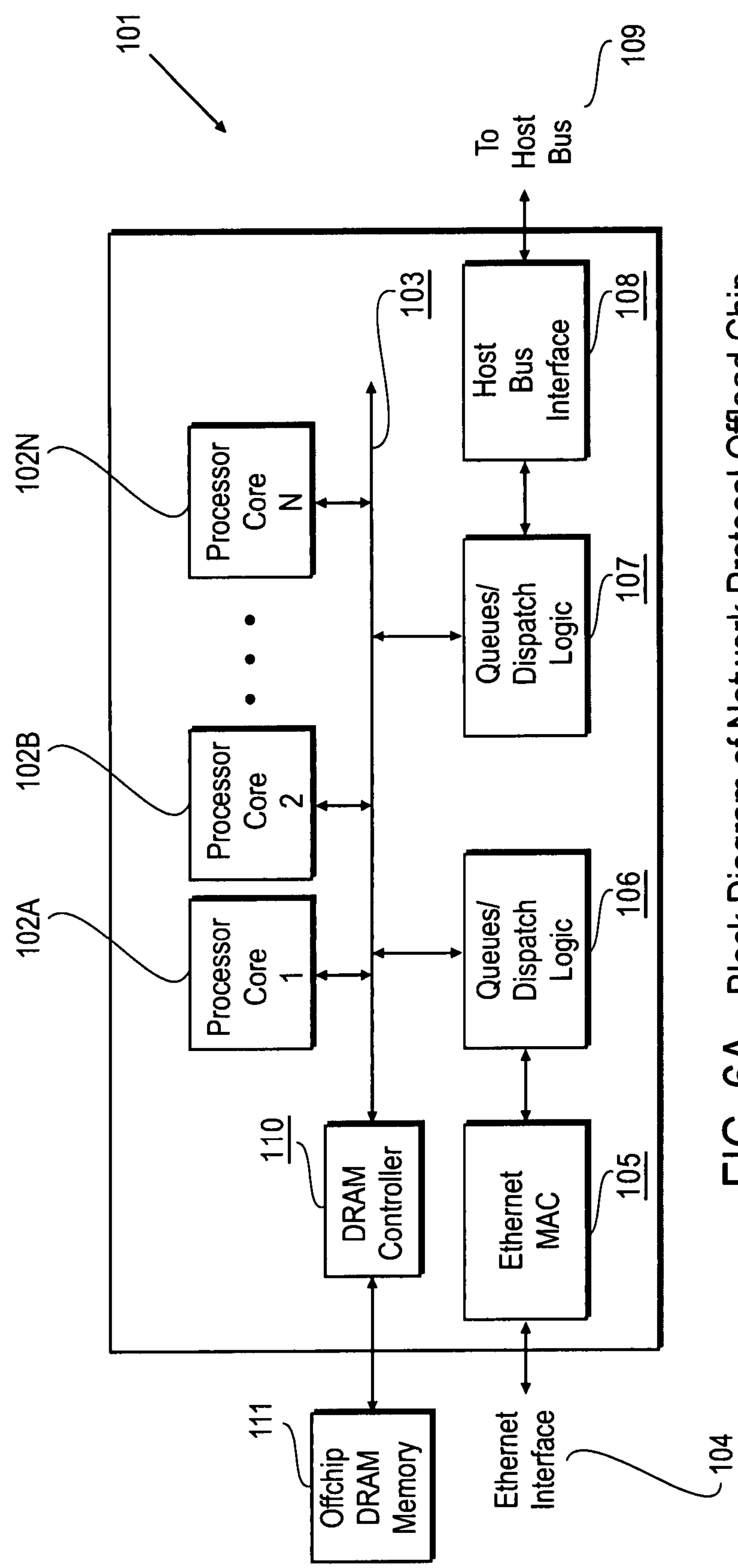
FIG. 6A Block Diagram of Network Protocol Offload Chip

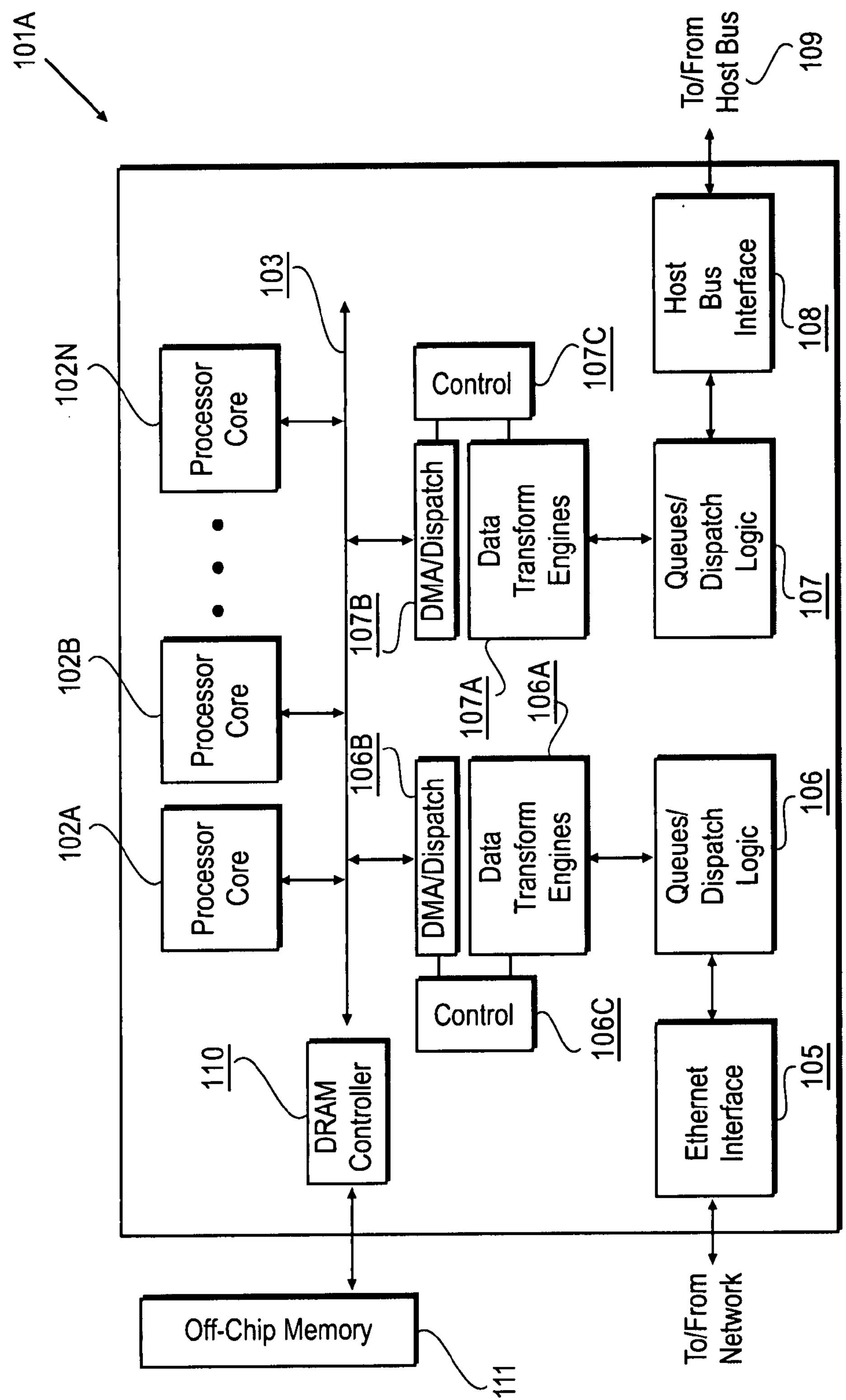
FIG. 6C Block Diagram of Data Transform Acceleration

Replication of listening sockets

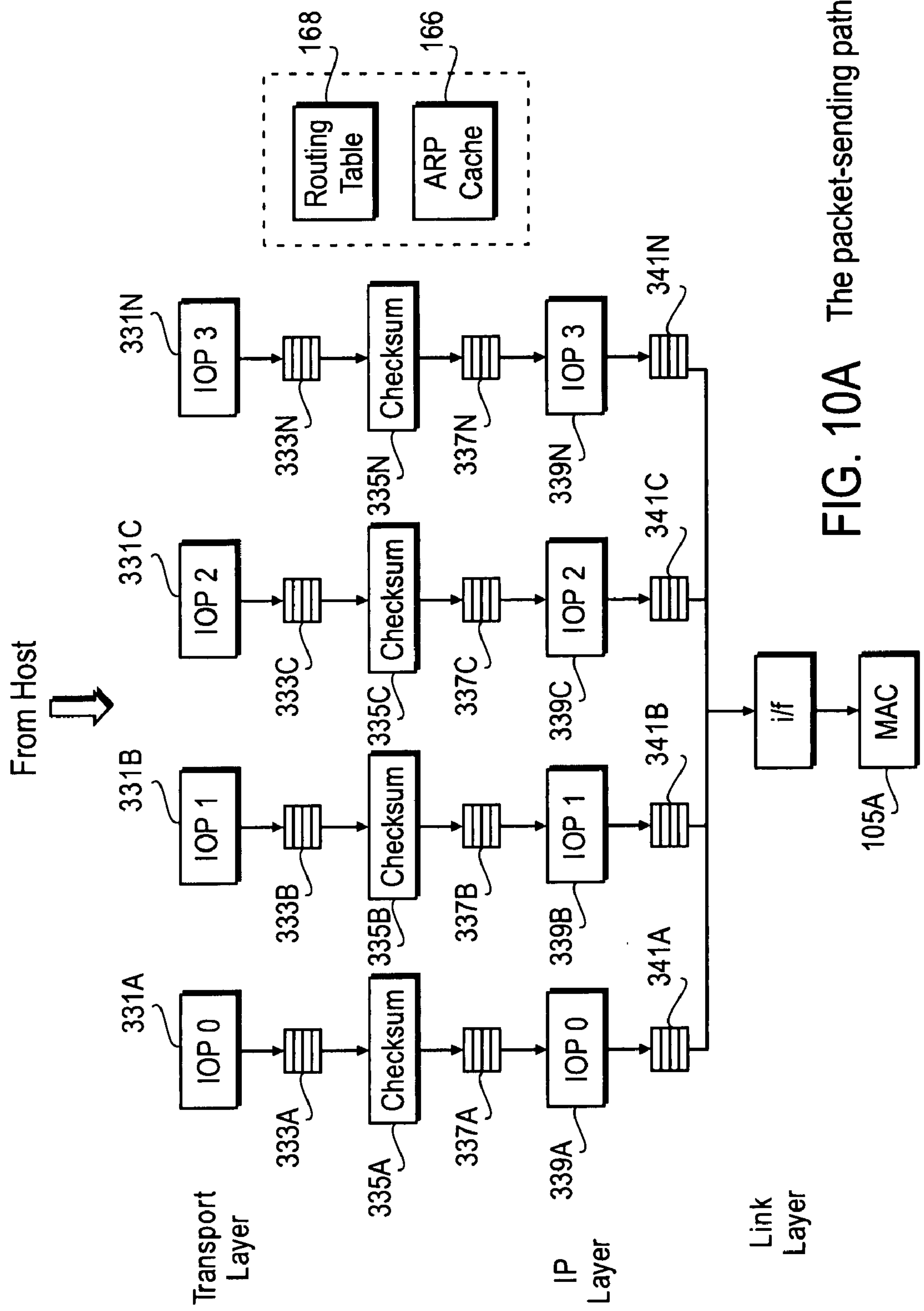
FIG. 10A The packet-sending path

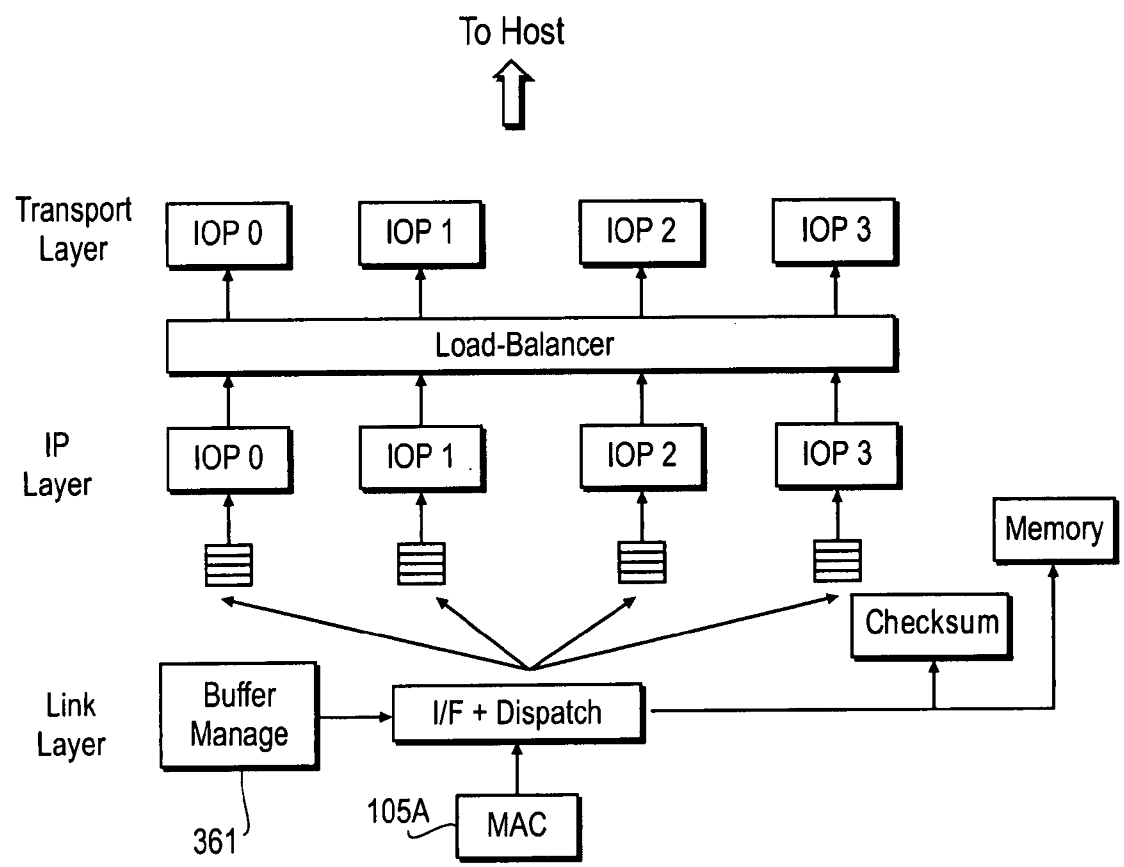
FIG. 10B The packet-receiving path

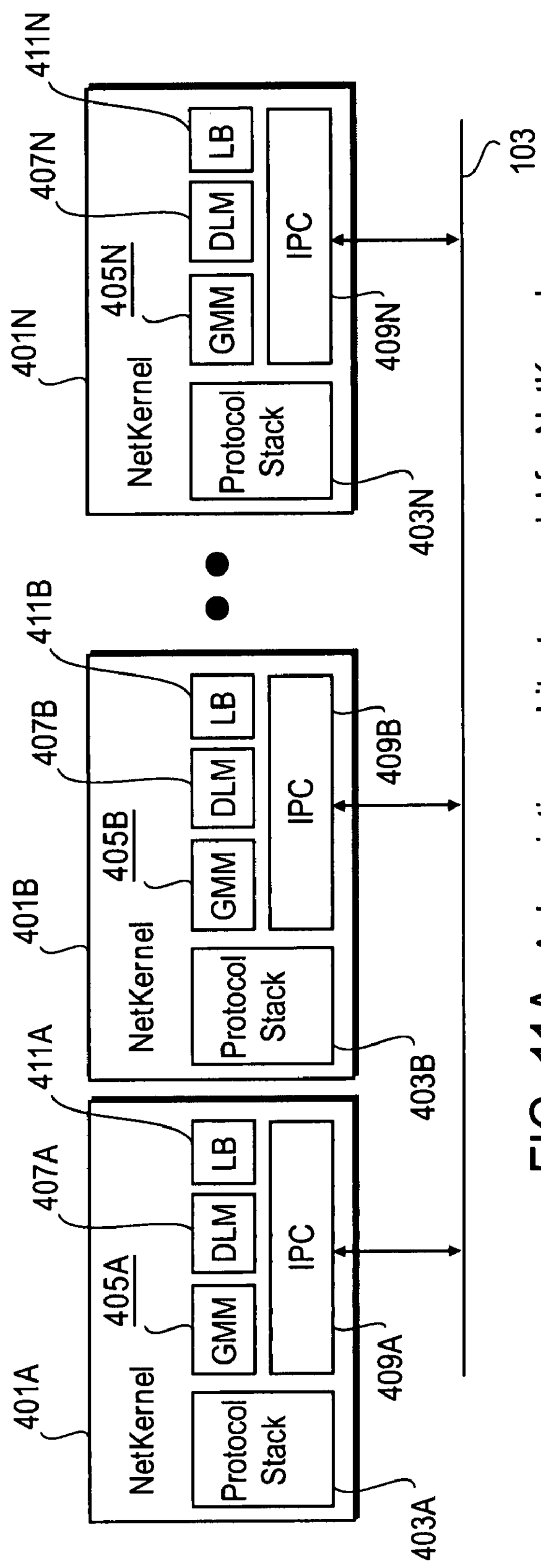
FIG. 11A A descriptive architecture model for NetKernel

An illustration of packet flows for load balancing

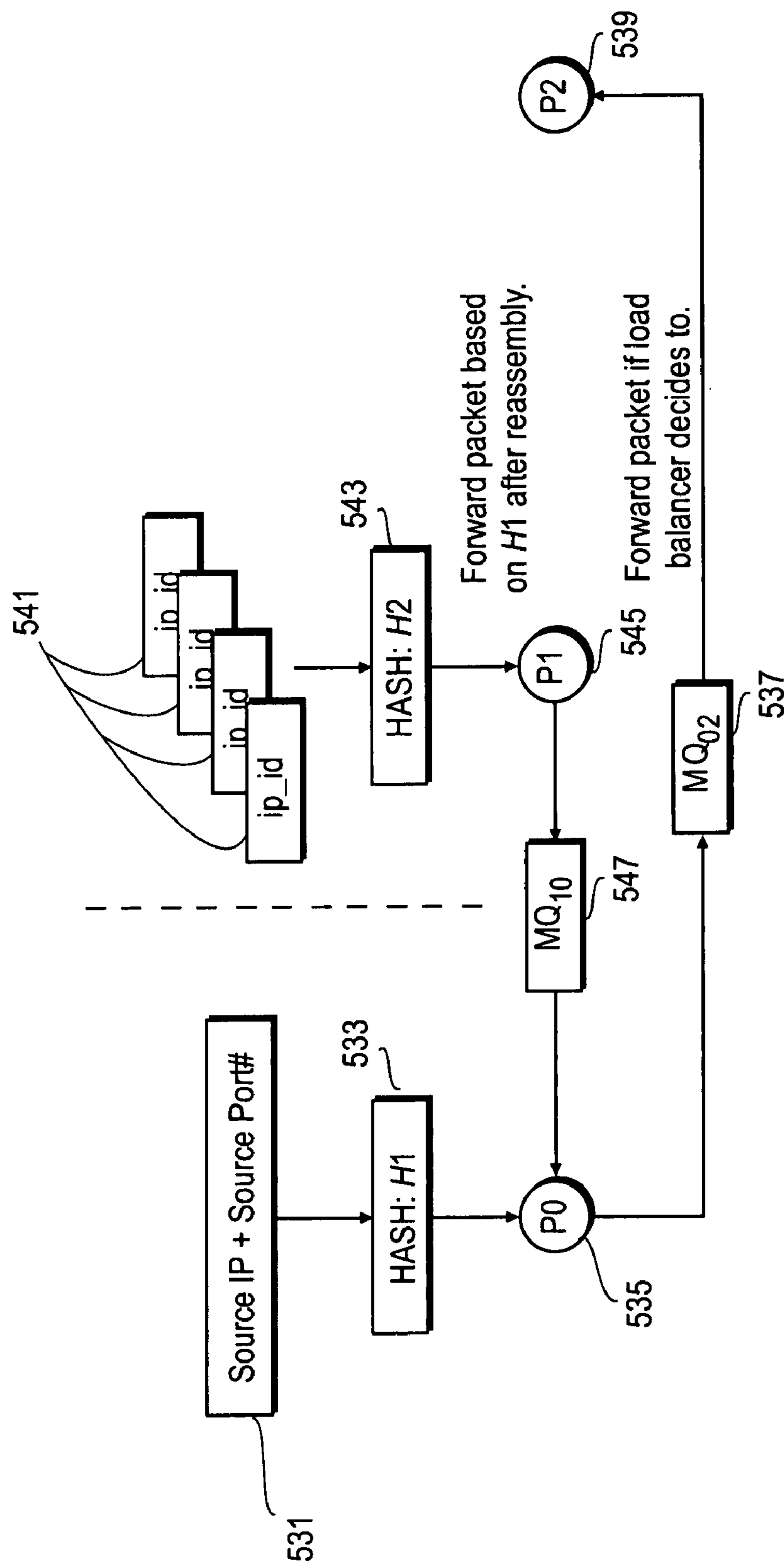
FIG. 12B Illustration of directing packets on address hashing and load balancing

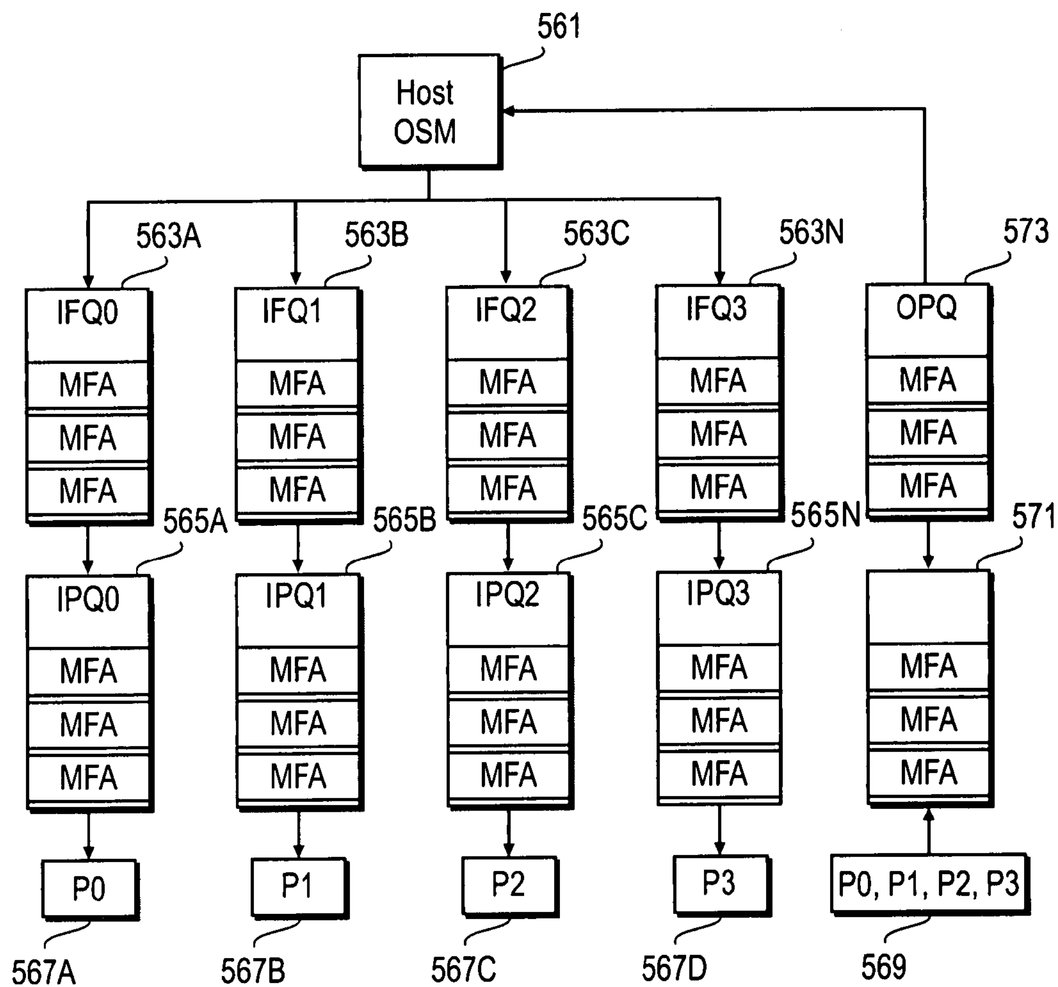
FIG. 13 I2O free and post queues in MSoC

114
To/From Network
Ethernet Internet MAC
105
118
Ethernet I/O
115A
111
Network Memory
Network Accelerator
116A
116N
Socket ISM
TCP/UDP
IP
(Processor 1)
Socket ISM
TCP/UDP
IP
(Processor N)
Host Interface N
117N
117
Host Interface 1
119
Host Bus1
120
Host 1 Processor(s)
Host 1 Memory
121
119N
Host Bus N
120N
Host N Processor(s)
Host N Memory
121N

METHODS AND SYSTEMS FOR PROCESSING NETWORK DATA

FIELD OF THE INVENTION

The present invention relates to systems and methods for processing network data.

BACKGROUND OF THE INVENTION

In recent years, network bandwidth has been increasing much faster than the speed of processing systems, such as computer systems and other systems that communicate with such networks. Increases in network bandwidth have been a result of new technologies and standards for both wide area networks (WANs) as well as for local area networks (LANs). WAN technologies such as SONET (synchronous optical networks) using DWDM (dense wavelength division multiplexing) have resulted in several orders of magnitude increase in available bandwidth over the span of only a few years. Similarly, LAN technologies such as gigabit Ethernet and ten gigabit Ethernet on copper and optical fiber have increased available network bandwidth by two orders of magnitude relative to standard 10- and 100-megabit Ethernet standards. During the same time period, the computational power of computers and other systems has been doubling about every 18 months. Because of the disparity between the processing speed of communication chips and the bandwidth of underlying network technologies to which they connect, many devices attached to networks cannot exploit the full bandwidth because of the lack of processing power on these devices.

FIG. 1 shows an example of a local area network. The devices on the local area network can include general purpose computers, such as computers 12A, 12B and 12C, as well as storage devices such as network storage devices 13A and 13B, as well as appliances for performing specialized functions, such as data caching and load balancing or other custom processing (see specialized appliances 14A and 14B). The actual communication path, whether by copper wire, optical fiber or wireless, can be implemented in a variety of topologies, such as switches, rings, or buses such as the bus 11 shown for the local area network 10. The local area network typically also includes a link 15 which may be a gateway system to other networks, such as the Internet.

The most common implementation of a local area network in use today is TCP/IP on Ethernet (or IEEE 802.3). TCP is a reliable, connection oriented stream protocol that runs on top of IP which is a packet based protocol. UDP is a datagram oriented protocol running on top of IP. Thus processing systems, such as computer systems in a computer network typically transmit information over the network in the form of packets. A number of different packet based protocols have been defined to enable interconnected network computers to communicate with each other. Generally, the network protocol requires each processing system connected to the network to check, process and route control information contained in each information packet.

An application program which is executing on a computer, such as a general purpose computer which is coupled to the network, may need to send data to another device on the network. In this situation, the application program makes a call to a network protocol stack socket interface, which calls the TCP/IP and the Ethernet drivers, in that order. Data is encapsulated first by a TCP (transmission control protocol) header, subsequently by an IP (Internet protocol) header, and lastly by an Ethernet header as shown in FIG. 2.

The application data 21 may be text or graphics or a combination of text and graphics or video/motion pictures or other types of data. As shown in FIG. 2, the TCP header 22 is appended to the application data 21 and then the IP header 23 is appended to the combination of the application data 21 and the TCP header 22. Finally, the Ethernet driver appends an Ethernet header 24A and an Ethernet trailer 24B. After the Ethernet driver has completed the encapsulation process, the entire packet (containing 21, 22, 23, and 24A and 24B) is transmitted over the communication medium of the network, which may be a copper wire, optical fiber, or wireless or other communication media to another device which is coupled to the network. The receiving device goes through the reverse sequence as shown in the graphic 20 of FIG. 2.

The processing of data through a network protocol stack is commonly done by processing systems, such as computer systems which are coupled to the Internet. For example, computer systems at a user's home process data through such a network protocol stack and web servers at web sites perform the same processing. FIG. 3 shows an example of a web site 31 which is coupled to the Internet 32. The web site may be considered to include three groups of processing systems 33, 34, and 35 as shown in FIG. 3. Information from the Internet 32 is received by the routers and processed by the firewall and load balancers and then distributed or transmitted to the web servers or other servers shown in block 34 or provided to the systems in block 35 through a further firewall. In this case, the computer systems must process incoming Internet packets through a network protocol stack such as that described above. Similarly, when a web server or other server or other system in blocks 33, 34 or 35 intend to transmit data through the Internet, then the data must be processed through the network protocol stack such as the stack described above. The actual bandwidth in connection with the transmission of data is a function of the capacity of the communication media (e.g. the optical fiber or other transmission media) as well as the processing throughput of the network protocol stack of the sending and receiving devices.

Web servers and other devices coupled to the network typically have an architecture which is shown in FIG. 4. This architecture includes a bus 53 which is coupled to a host processor or processors 55 and which is also coupled to host DRAM and memory controller 54. The host processor or processors 55 customarily perform the network protocol processing. Ethernet packets are received through the Ethernet interface and framed by an Ethernet MAC (media access controller) integrated circuit 52. The Ethernet MAC integrated circuit transfers the framed Ethernet packets to the host DRAM (dynamic random access memory) generally by performing a direct memory access (DMA) under control of the memory controller and/or interrupting the memory controller. It will be appreciated that the computer system 51 typically also includes associated logic referred to as a "chipset" which performs control functions such as control of the bus 53 and the communication of data among the different components in the system such as peripherals (not shown). The host processor 55 is interrupted by the chipset, and the TCP/IP stack is invoked to examine the Ethernet packets for IP processing and subsequent TCP processing before passing the data to the application layer. An application which is sending data to the Ethernet interface invokes the TCP/IP stack, and the reverse sequence occurs. Thus, in the implementation shown in FIG. 4, the host processor 55, which is typically a general purpose microprocessor or collection of general purpose microprocessors, is performing substantially all of the operations of the system 51 as well as performing the network protocol processing. As a result, the host processor 55, in addition to running the application program which is processing the application data, must also process network packets to perform such operations as fragmenting, reassembly, reordering, retransmission, and verifying of checksums of the packets.

Computer systems with connections to higher bandwidth networks are dedicating hardware to process parts of the network protocol stack. FIG. 5 shows an example of such a computer system with acceleration hardware to offload the network protocol stack processing. The processing system 61 has an Ethernet interface port 62 which is coupled to an Ethernet MAC 63, which in turn is coupled to a network offload accelerator 64. Offload memory 65 is coupled to the network offload accelerator 64. This memory is for storage and retrieval of network packets being transmitted to the Ethernet port 62 or being received from the Ethernet port 62 as part of the processing operation of the network offload accelerator 64. The network accelerator 64 is coupled to the host bus 67 through the host bus bridge 66. Host processor or processors 68 is also coupled to a host bus 67. Host DRAM 70 is coupled to the bus 67 through the host chipset 69 which functions as a memory controller and bus controller for the system. The network offload accelerator 64 may be implemented as a general purpose embedded processor or a custom hardware implementation of a specific network protocol, or a combination of the two. The advantage of the general purpose embedded processor is that if network protocols change, software can be changed to reflect the new protocol and no hardware changes are required. The advantage of a custom ASIC implementation is that it may achieve higher performance or smaller die size. Current generation embedded processors may be used to offload the network protocol stack processing in the architecture shown in FIG. 5 and can achieve a wire rate throughput for 100 megabit Ethernet connections. However, they cannot satisfy wire rate throughput for gigabit Ethernet processing demands.

SUMMARY OF THE INVENTION

Methods and apparatuses for processing data communicated through a network are described herein. In one aspect of the invention, an exemplary method includes processing a first group of network packets in a first processor which executes a first network protocol stack, where the first group of network packets are communicated through a first network interface port, and processing a second group of network packets in a second processor which executes a second network protocol stack, where the second group of network packets are communicated through the first network interface port.

In one particular exemplary embodiment, the first and second network protocol stacks are separate processing threads, and the first group of network packets are associated with a first network session between a host processing system and a first digital processing system, and the second group of network packets are associated with a second network session between the host processing system and a second digital processing system. Further, the first group of network packets is assigned to the first processor through a programmable hashing operation on the first group of network packets, and the second group of network packets is assigned to the second processor through the programmable hashing operation. In one exemplary embodiment, these network protocols are the same and include at least the Internet protocol (IP) and the transmission control protocol (TCP).

The present invention includes apparatuses which perform these methods, including data processing systems which perform these methods, and computer readable media which when executed on a data processing system, causes the system to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 6A shows a block diagram of one embodiment of a network protocol processor offload integrated circuit.

FIG. 6C shows another block diagram of one embodiment of a system for network protocol processing according to the present invention.

FIG. 10A shows a data flow for a packet sending pathway according to one embodiment of the present invention.

FIG. 10B shows a data flow for a packet receiving path according to one embodiment of the present invention.

FIG. 11A shows a descriptive architecture model for a software component of one embodiment of the present invention.

FIG. 12B illustrates a method for directing packets with address hashing and load balancing according to one embodiment of the present invention.

FIG. 13 shows, according to one embodiment of the present invention, a communication method for communicating between a network processor of the present invention and a host system.

DETAILED DESCRIPTION

Figure 1:
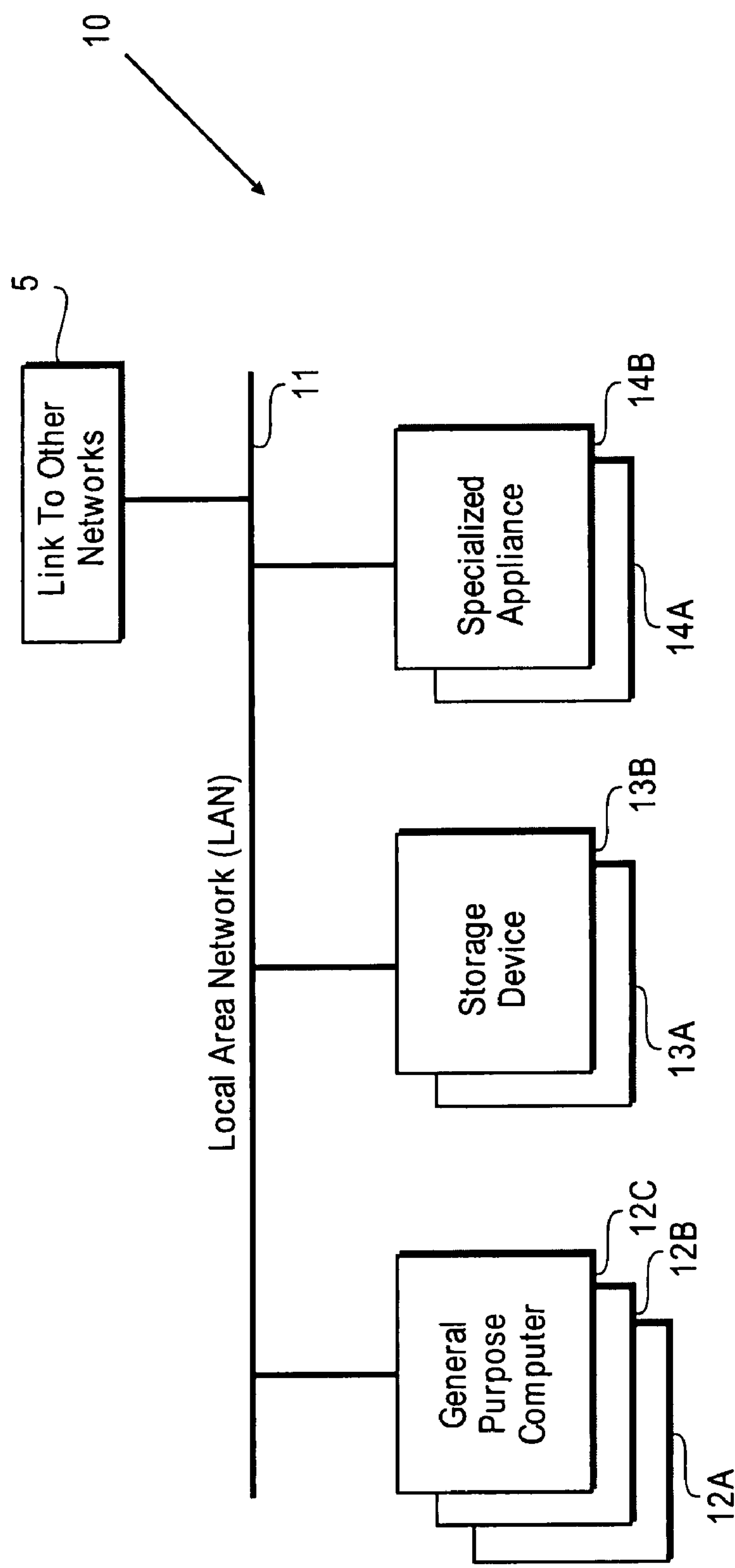
FIG. 1 shows an example of a local area network.
Figure 2:
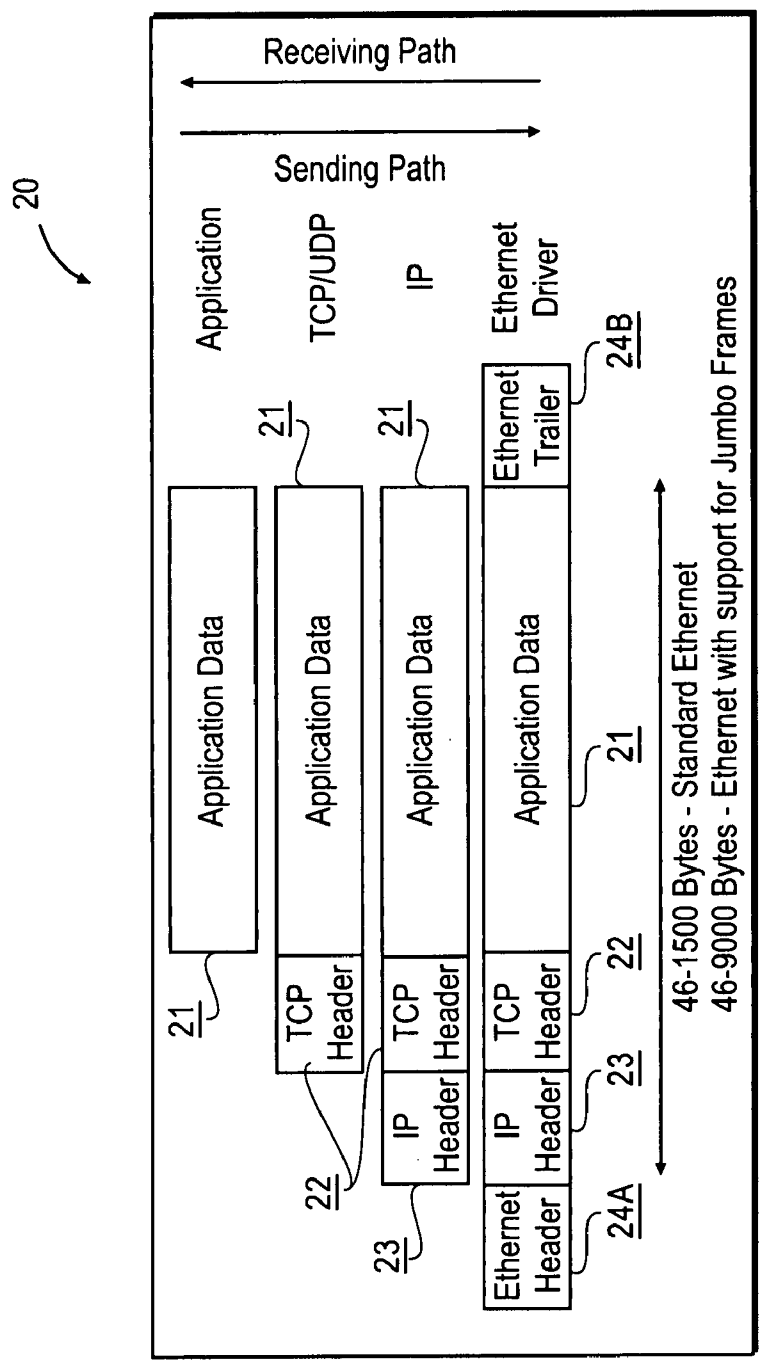
FIG. 2 shows the encapsulation of data through a network protocol processing stack.
Figure 3:
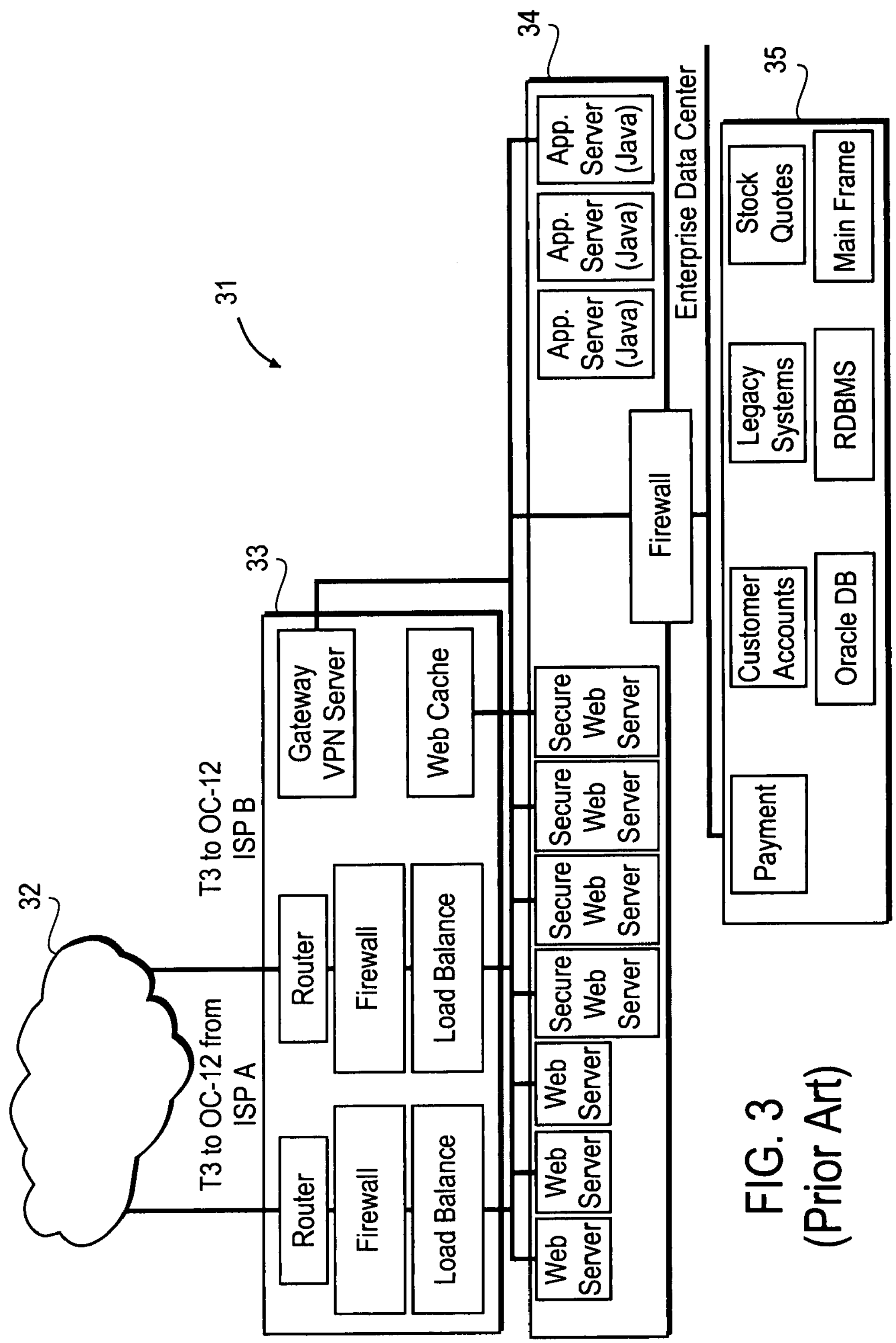
FIG. 3 shows an example of a typical web site and the various components of the web site.
Figure 4:
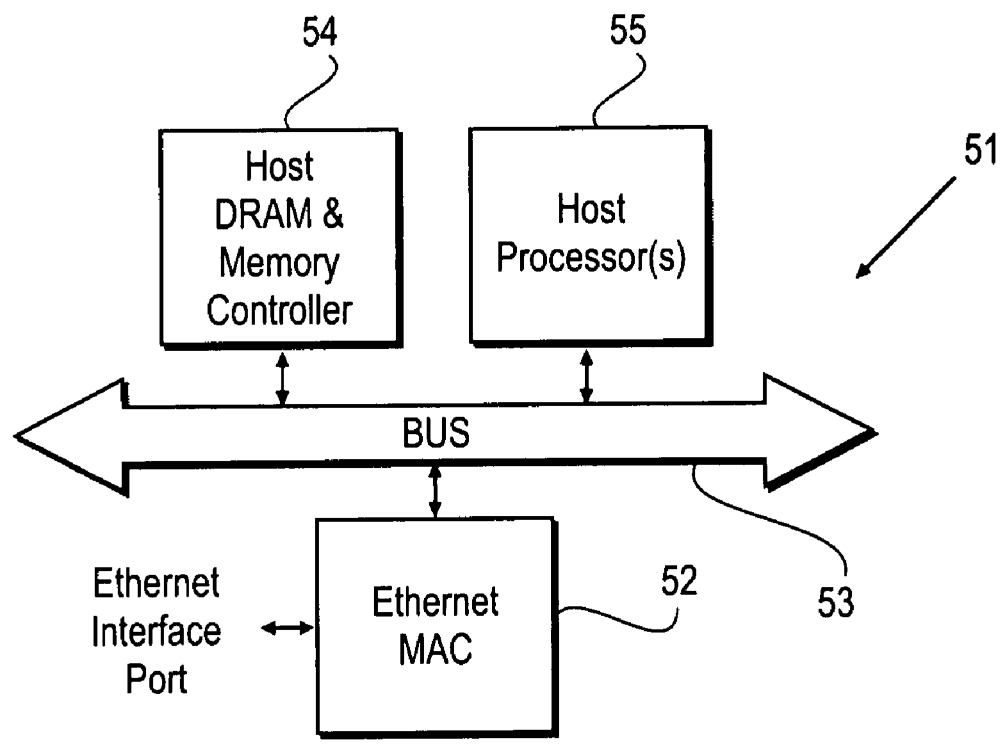
FIG. 4 shows an example in the prior art of a processing system such as a conventional, general purpose computer system.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

FIG. 6A shows one example of a network protocol processing system of the invention. The system 101 may be implemented on a single integrated circuit or on multiple integrated circuits; however, it is preferred that a single integrated circuit contain the entire processing logic shown in system 101 of FIG. 6A. The system 101 contains multiple processors, each executing separate network processing stacks to manipulate and direct data between a network interface such as the Ethernet interface 104 and the interface to the host bus 109. The system further includes memory such as DRAM memory 111. One implementation of the invention contains four general purpose embedded processors on a single integrated circuit along with the logic 105, 106, 107, 108, 110, and the bus 103. Each processor, such as processor 102A, 102B, and 102N runs a separate thread of the TCP/IP network protocol stack. Packets arriving from the network interface 104 are framed by the Ethernet MAC 105 and are sent to the Ethernet queue/dispatch logic 106. The queue/dispatch logic 106 contains logic that examines the packet header information, including the IP header fields and the TCP header fields. The IP and TCP headers are hashed via a programmable set of mask and select registers and generate a target processor number which is used to select the particular processor to process the corresponding data in the IP and TCP fields. The Ethernet interface dispatch logic 106 then transfers the packet via a DMA operation to a preallocated memory buffer for the target processor; this memory buffer is typically in the offchip DRAM memory 111 which is controlled by the DRAM controller 110. Once the packet is successfully copied to memory 111, the queue/dispatch logic 106 interrupts the corresponding processor which was identified or selected as the target processor. The processor examines the packet header data and performs the appropriate TCP/IP processing without reading or copying the data portion (e.g. "application data") of the datagram or packet. Once packet processing is complete, the processor inserts the addresses for the processed packets in a buffer of the queue/dispatch logic 107, and the dispatch logic 107 then initiates a DMA operation to host memory through the host bus interface 108.

Packets arriving from the host interface such as host bus 109 go through a similar sequence of steps. One difference, however, is that the assignment of packets from the host interface to a particular processor on the network protocol processing system 101 is based on a tag in the connection handle created between the host and the network processor system 101. Once a packet arrives from the host and is assigned to a processor, the sequence is the reverse as that described above for packets arriving from the Ethernet interface. Further details concerning the operation of various embodiments of a network protocol processing system of the present invention are further described below.

Figure 5:
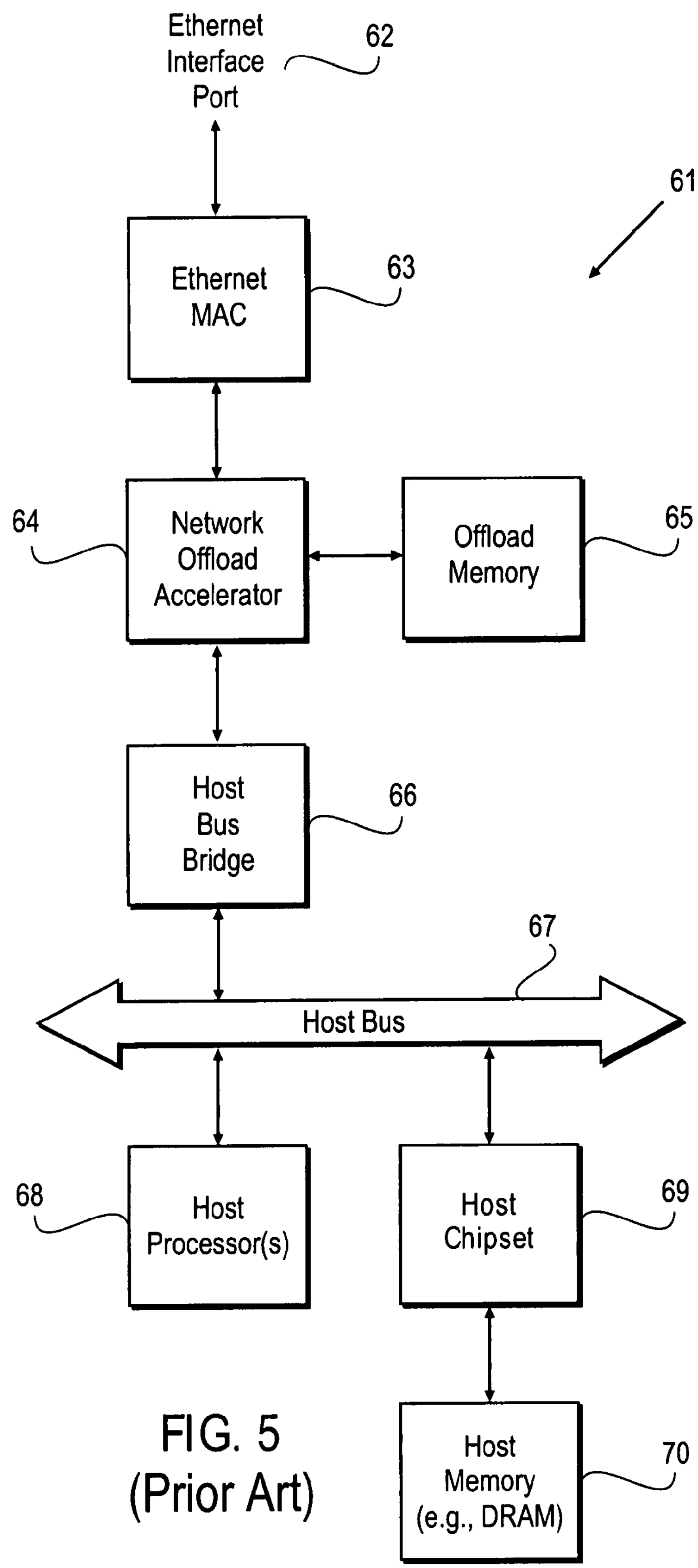
FIG. 5 shows an example in the prior art of a data processing system which includes an accelerator for processing network packets.

Various embodiments of the present invention provide numerous advantages, although it will be appreciated that only some embodiments may provide all the advantages while other embodiments provide fewer advantages. One advantage of an architecture includes the scalability of processing throughput as a function of the speed and number of processors. Dispatch logic, such as dispatch logic 106 and 107, assign packets to a specific processor. This allows each processor to run a separate thread of a TCP/IP network protocol stack. This eliminates most coherency and serialization normally seen in systems with multiple processors. An architecture of the invention also has the advantage that it supports future changes and enhancements to a network protocol stack such as the TCP/IP protocol stack. Since the network protocol stack processing is performed in software which is being executed by each processor, such as processor 102A, 102B, and 102N, and since the fields used to generate the hash function to assign packets to target processors is programmable, enhancements and changes to the TCP/IP suite of protocols can be supported via software changes. Another advantage of an architecture of the invention is an improvement in memory bandwidth. Memory bandwidth is one of the main bottlenecks in network processing, both when processing the network protocol stack in the primary processor (e.g. a Pentium microprocessor) of a general purpose computer or when offloaded to a network protocol processing device such as the accelerator 64 shown in FIG. 5. Designating preallocated memory buffers for use by the dispatch and queue control logic within logic 106 and 107 allows the packets to be copied to their final memory location. Another advantage to an architecture of the present invention is the reduction of interrupts in the processing of network packets. Dedicated DMA engines and control queues in the logic 106 and 107, which transfer packets to and from both the network (e.g. Ethernet) interface and the host interface, eliminate processor idle time during the DMA operations. That is, the processors such as processors 102A, 102B and 102N, may perform network protocol processing with packets while other packets are undergoing DMA operations to and from interfaces 104 and 109. Another advantage of an architecture of the present invention is that the efficiency of the host processor is increased, since the host processor does not execute the network protocol stack. Host processor cycles which were consumed by network protocol processing are now freed up for application data processing.

Figure 6B:
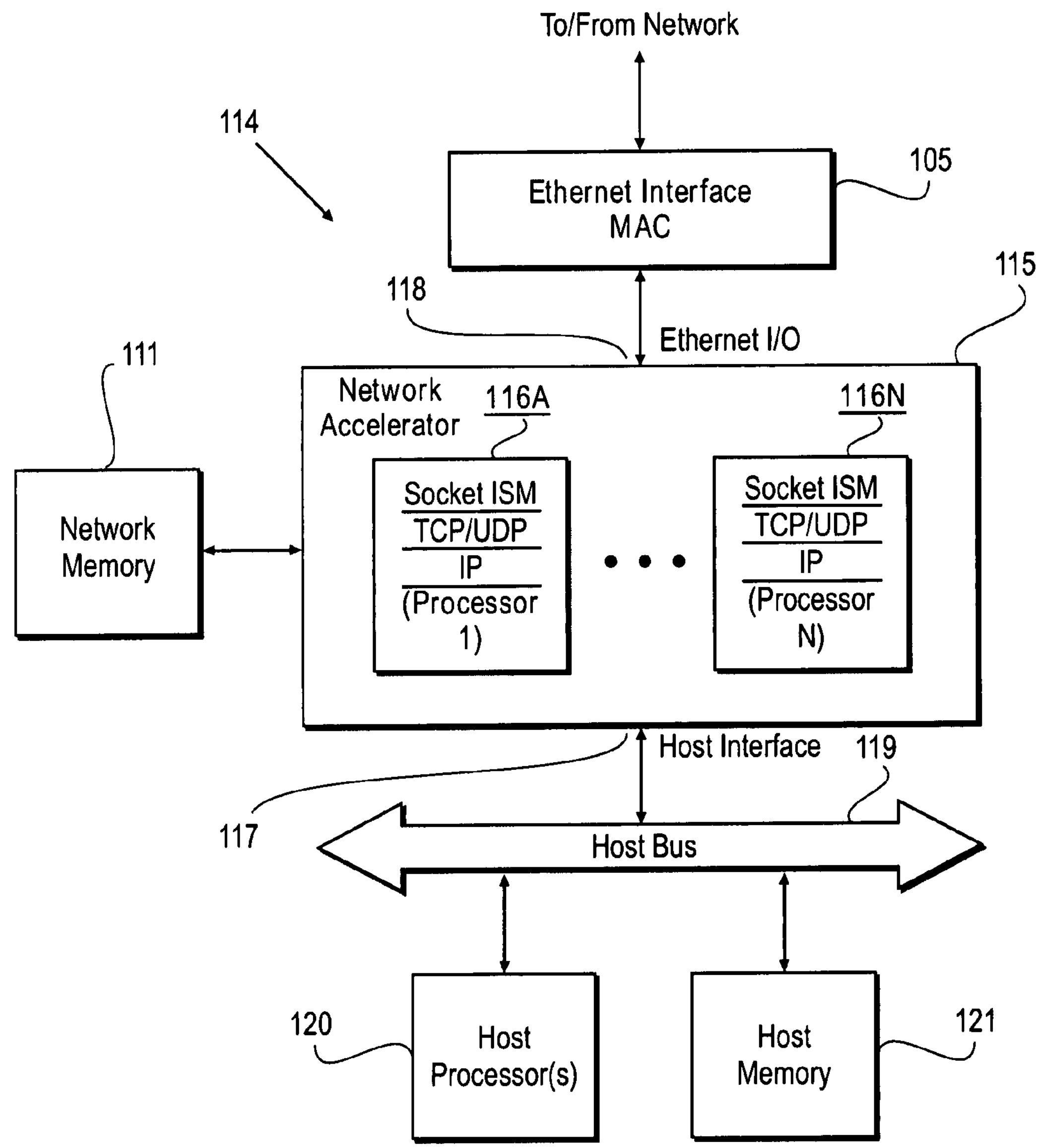
FIG. 6B shows a part-software/part-hardware architecture in which a network protocol processor of the present invention is used in a system of the present invention.

FIG. 6B shows an example of a system 114 which uses a network processor of the present invention. The network processor 115 may be similar to the network processor 101 of FIG. 6A and includes multiple processors, each executing a separate network protocol stack. The processors are coupled through a network connection 118, which in the case of FIG. 6B, is shown as an Ethernet input/output which in turn is coupled to the Ethernet MAC 105. On the host side, the network processing system 115 is coupled through a host interface 117 to a host bus 119. A host processor or processors, such as an Intel Pentium microprocessor 120, is coupled to the host bus 119 and is coupled to the host memory 121 through the host bus 119. It will be appreciated that other components, such as host chipset components for providing memory control and bus control and control of peripherals, may also be part of the system shown in FIG. 6B. It will be appreciated that FIG. 6B shows one example of a typical computer system which may be used with the present invention. While FIG. 6B illustrates the various components of a computer system, it is not intended to represent any particular architecture or manner of interconnecting the components, as such details are not germane to the present invention. For example, a system may include multiple buses such as a system bus, a processor bus, and peripheral bus or buses. It will also be appreciated that network computers and other data processing systems which have fewer components or perhaps more components may also be used with the present invention. Additional components not shown in FIG. 6B may include display controllers and display devices, and input/output devices such as mice, keyboards, backup storage devices, and printers. It will be appreciated that if the system shown in FIG. 6B includes multiple buses, these will typically be interconnected to each other through various bridges, controllers, and/or adapters as is well known in the art.

The network protocol processing system 115 shown in FIG. 6B may include N processors; in one embodiment, N is equal to 4. Each processor executes its own TCP/IP protocol stack and also executes a socket ISM set of computer programming code in order to communicate with the host processor 120 as is further described below. As shown in FIG. 6B, processor 1 executes a stack of software code 116A which includes software for processing the IP protocol and software for processing the TCP or UDP protocols as well as processing the socket ISM software for allowing processor 1 to communicate with host processor 120 and the host memory 121. Similarly, processor N includes a similar set of computer software which is being executed as a separate network protocol stack and communication control. The network protocol processor 115 may be implemented in multiple integrated circuits or a single integrated circuit.

FIG. 6C shows an alternative network protocol processing system 101A which contains many of the same logic blocks as the system 101 of FIG. 6A. However, the network protocol processing system 101A further includes data transform engines 106A and 107A along with DMA/dispatch logic 106B and 107B and control logic 106C and 107C. These data transform engines may be used to process the data before it is stored in the offchip memory 111 or after it is retrieved from the offchip memory 111.

Figure 7:
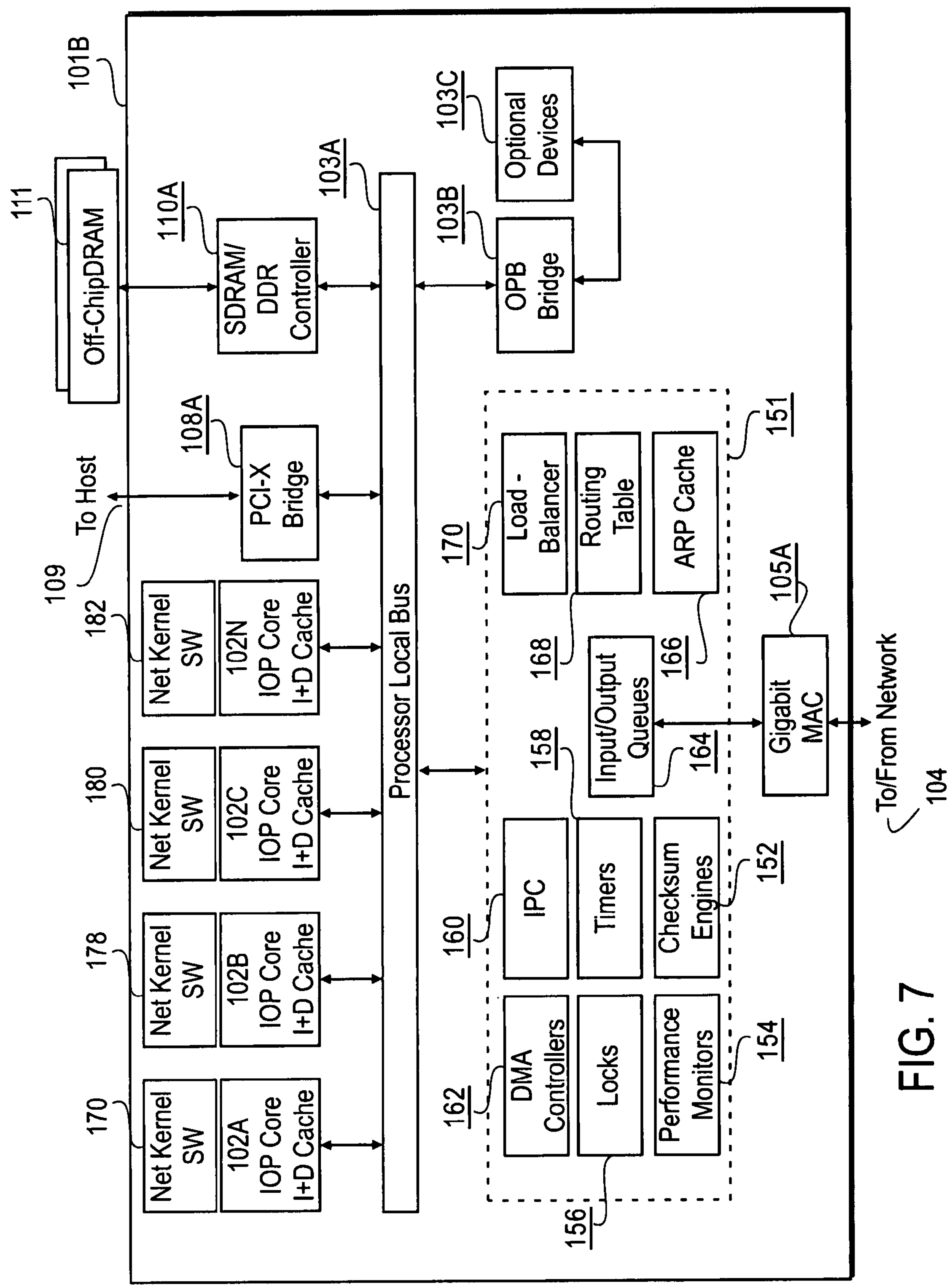
FIG. 7 shows another example of a network processor system according to the present invention.

FIG. 7 shows a detailed block diagram view of a particular implementation of a network protocol processing system which is similar to the system shown in FIG. 6A. In the embodiment of FIG. 7, there are 4 separate processors, 102A, 102B, 102C, and 102N, each of which process their own separate threads of network protocol stacks as well as a net kernel operating system software shown as software 176, 178, 180, and 182 for their respective processors. Each processor includes an instruction and data cache and each processor is coupled to the local bus or processor local bus 103A. As noted above, the system 101B may be implemented on a single integrated circuit or it may be implemented as multiple integrated circuits. The system 101B has three main input and output interfaces; the first is interface 104, which is a connection to the network communication medium such as an Ethernet communication medium. The interface 109 is a connection to the host bus such as the host bus 119 of FIG. 6B. The third interface is the interface to offchip DRAM 111 which may be a conventional interface to DRAM which is controlled by the SDRAM or DDR RAM controller 110A, which in turn is coupled to the processor local bus 103A. The interface to the host 109 is controlled by a PCI-X bridge 108A in one embodiment where the host bus, which is coupled to this interface 109, is a PCI bus. The network protocol processing system 101B also includes an onchip peripheral bus bridge 103B which allows optional devices 103C, such as a JTAG or UART port, to be included in the system 101B. The system 101B further includes control and processing logic 151 which serves to provide the function of the control logic 106 and 107 of FIG. 6A. Control logic 151 includes checksum engines 152 which may be used to perform checksum operations on data which is being transmitted into or from the network protocol processing system 101B. Performance monitors 154 may be used to monitor the performance of the various processors and may provide input to the load balancer 170 which attempts to balance the queue of packets which are to be processed by each processor 102A, 102B, 102C, and 102N. Timers 158 may be used to implement TCP timers. Each processor 102A, 102B, 102C, and 102N may have a dedicated set of TCP timers. Locks 156 provide a means of ensuring exclusive access to system resources by the processors 102A, 102B, 102C, and 102N. The interprocessor communication 160 acts as a manager and a buffer for interprocessor communication between the processors 102A, 102B, 102C, and 102N. Messages between the processors are managed through the interprocessor communication control 160. The input/output queues 164 maintain a list of packet data which is being processed either for input or for output by the system. Internet protocol (IP) routing table 168 is used as part of the conventional routing process according to the IP protocol. An address resolution protocol cache 166 is used for the conventional Ethernet address resolution protocol.

One aspect of the multiple network protocol processors in the invention is the memory coherence model provided to the software and applications running on the processors. There are two basic models, a hardware-managed coherent memory system, or a software-managed coherent memory system. This invention applies equally well to either model.

There are many commercial implementations of hardware-managed coherent multiprocessors (MP) available from manufacturers such as IBM, Hewlett-Packard, Sun Microsystems, and Compaq. This model places a minimal burden on programmers to achieve correct program operation, but requires complex hardware to synchronize the contents of memory and processor caches in the presence of simultaneous accesses to a given memory location by multiple processors. Furthermore, as is well-known to those practiced in the art, hardware-coherent MP systems suffer from an inherent scaling problem. Overall systems performance does not scale linearly as the number of processors is increased due to contention for memory access and cache coherence. Thus, while writing application programs (such as the ISM) to run correctly on a hardware-coherent MP is easier than a software-coherent MP, achieving high performance on these applications may be more difficult. This difficulty is magnified if the application is inherently serial, or was not coded with parallelism in mind. Thus, a multiprocessor whose caches and memory are managed via software has an important advantage because it forces the software to be coded with parallelism in mind from the outset. This can frequently lead to higher performance than a corresponding application which was ported to a hardware coherent MP.

Given that packet protocol processing is inherently parallel, and therefore amenable to parallel processing, a preferred embodiment uses multiple network processors whose caches and memory are kept coherent by software (software-managed coherent memory system). This simplifies the hardware design and provides the equally desirable property of forcing the software to be written with parallelism in mind from the beginning.

However, a means of synchronizing multiple processor access to memory should still be provided. The lock hardware (156 in FIG. 7) provides this function by allowing atomic access to a subset of the memory space. Each lock is implemented as a well-known test-and-set primitive (but may have other semantics in other embodiments of the invention, such as compare-and-swap, fetch-and-add, etc.) to allow software to coordinate multiple access to critical sections of code to enable only one processor to access a given memory location. Thus, along with the other aspects of this invention, the lock hardware enables parallel processing of packets with minimal hardware complexity, and minimal software effort.

Various methods of the present invention will now be described by referring to FIGS. 8A, 8B and 8C. The network protocol processing system which may be used with these methods includes the system shown in FIG. 6A or 6B, for example. The method of FIG. 8A describes a process flow upon the receipt of network packets from the network communication medium, such as an Ethernet network. The network packets are received at a single network interface port in operation 201. Typically these network packets will include header data and application data. In operation 203, a first group of network packets is distributed from the single network interface to a first processor which is executing a first network protocol stack in order to process the first group of network packets. In operation 205, a second group of network packets is distributed from the single network interface port, to a second processor which is executing a second network protocol stack in order to process the second group of network packets. In this case, the first and second network protocol stacks are separate processing threads such as the processing threads 116A and 116N of FIG. 6B. As shown in operation 207, after the first processor processes the first group by executing the first network protocol stack, first data associated with the first group is transmitted to a host bus interface and, through a DMA operation, this first data is written to host memory. In the system shown in FIG. 6B this occurs by transferring this first data through the interface 117 onto the bus 119 and into host memory 121. In operation 209, after the second processor processes the second group by executing the second network protocol stack, second data associated with the second group is transmitted to the host bus interface and, through a DMA operation, this second data is written to the host memory. The foregoing description and FIG. 8A assume a certain sequence of operations. It will be appreciated that a different sequence may also occur (e.g. the second processor may complete the processing of the second group before the first processor completes the processing of the first group). These alternative sequences of the operations will be recognized to be merely alternatives of the present invention, as the exact sequence, such as when the first group is processed relative to the second group or when the first group is distributed relative to when the second group is distributed, depend upon the particular circumstances in which the system of the present invention is operating.

Figure 8A:
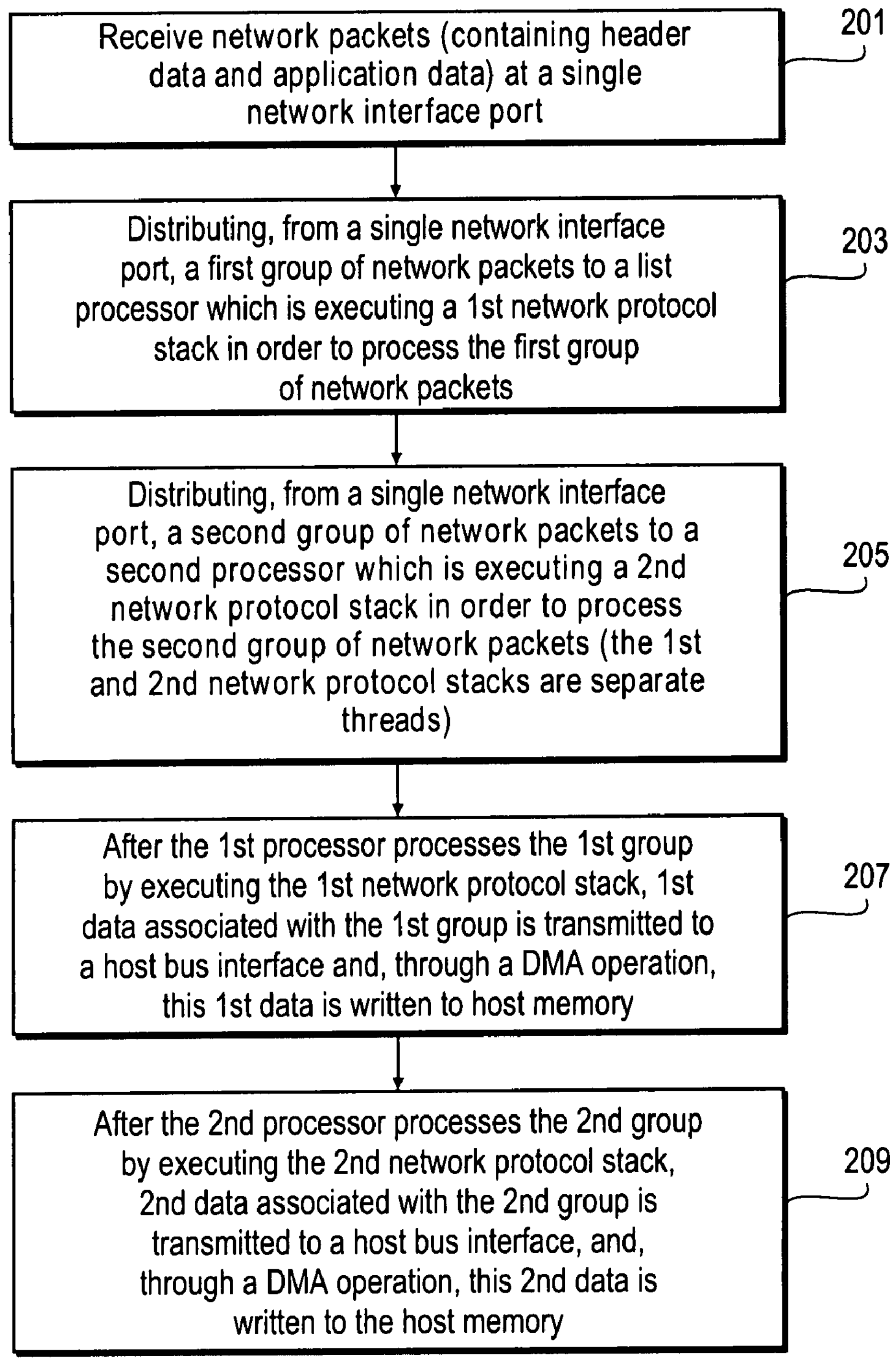
FIG. 8A shows an exemplary flowchart of one method of the present invention.
Figure 8B:
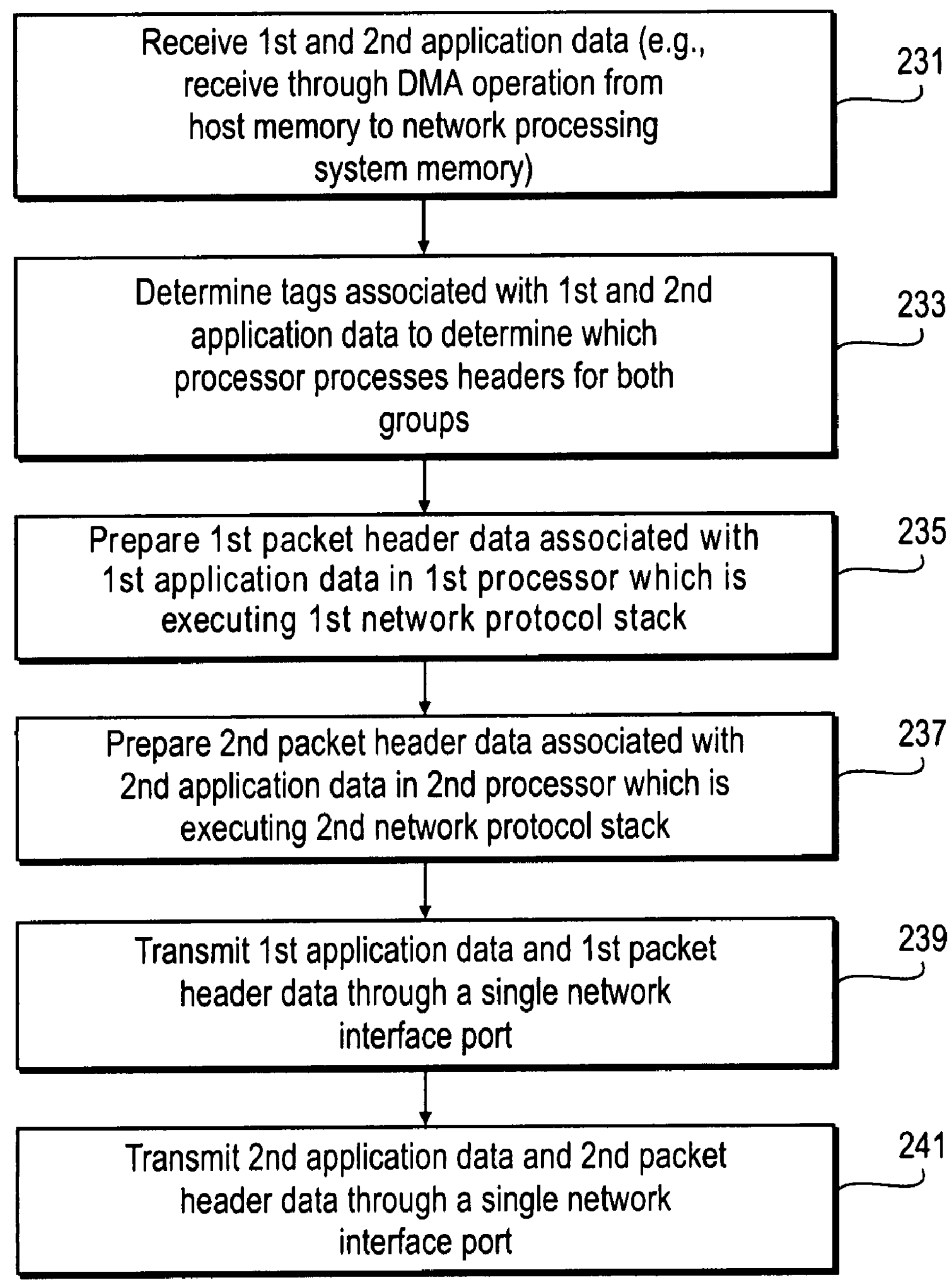
FIG. 8B shows another exemplary method of the present invention in a flowchart.

FIG. 8B illustrates an exemplary method in which a network protocol processing system of the present invention transmits data from a host system onto a network communication medium, such as an Ethernet communication medium. In operation 231, first and second application data is received. This may occur through a DMA operation from the host memory to network processing system memory such as memory 111 shown in FIG. 6A. In operation 233, tags which are associated with the first and second application data are examined to determine which processor processes headers for both groups. The determination of these tags is controlled by the execution of OSM software on a host processor which is part of an I2O system which consists of the host processor or processors and the network processor; this I2O system is further described in conjunction with FIG. 13 below. In operation 235, a first packet header data associated with the first application data is prepared in a first processor which is executing a first network protocol stack. In operation 237, a second packet header data which is associated with a second application data is prepared in a second processor which is executing a second network protocol stack. In operation 239, the first application data and its associated first packet header data are then transmitted through a single network interface port, and in operation 241, second application data and its associated second packet header data are transmitted through the single network interface port.

As was noted relative to FIG. 8A, the various operations shown in FIG. 8B may be performed in a different order than that shown in FIG. 8B.

Figure 8C:
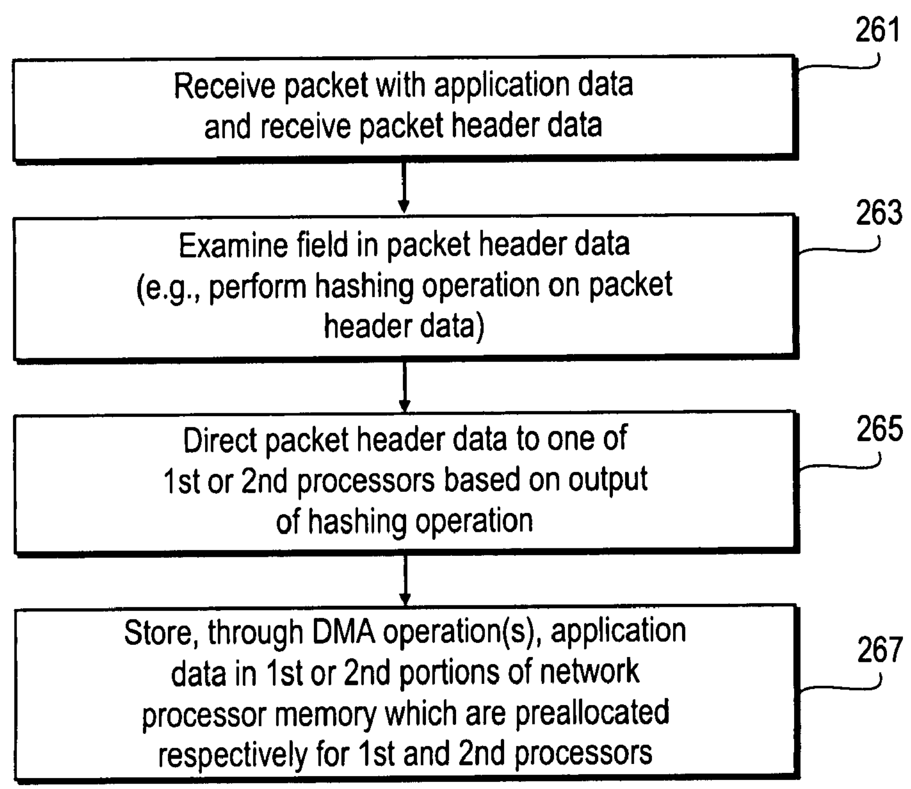
FIG. 8C is a flowchart showing another exemplary method of the present invention.

FIG. 8C shows another aspect of the present invention in which packets are directed to various processors based upon a hashing operation, which in one embodiment is programmable. In operation 261, a packet with application data and associated packet header data is received. This would typically occur by receiving the packet through a network interface such as the interface 104 of FIG. 6A. Then in operation 263, a field in the packet header data is examined. Typically this involves performing a hashing operation on the packet header data. Normally for non-fragmented packets, the hashing function looks at the IP source address and the TCP source port number and the TCP port destination number when performing the hashing operation; the output of the hashing operation or function determines the appropriate processor which is the target processor and which will perform the processing on the packet according to the network protocol processing stack. Thus, gas shown in operation 265, the packet header data is directed to one of a group of processors based on the output of the hashing function. In operation 267, the application data which is associated with the packet header data is stored, typically through a DMA operation in dedicated network processor memory such as memory 111 of FIG. 6A. This application data is typically stored in either of a first or second portion of a network processor memory such as memory 111, which is preallocated, respectively, to the first or second processors. It will be appreciated that if the network processing system includes more than two processors that there will be more than two preallocated portions of the memory. That is, each processor in the network protocol processing system has, in one embodiment, its own preallocated portion of the network processor memory such as memory 111. For fragmented packets, the IP identification for the session is used to determine the target processor. In particular, if a packet has the same IP identification as another packet previously received, then it is part of the same fragment and it is directed to the same target processor as the prior portion of this packet.

Although the network protocol processing systems of some embodiments of the invention contain multiple processors running multiple operating system kernels and protocol stacks, the system appears as a single network interface to the host processor or processors. This can be seen from FIG. 6B in which there is one Ethernet interface and one host interface. The parallel processing capability of the network protocol processing system, such as the system 115, is effectively transparent to the host processor or processors and allows for processing of network packets at speeds that match the network transmission speeds, such as 10 gigabit Ethernet. The host processors and the external network environment perceive the network protocol processing system of the invention, such as system 115, as a single network interface with an assigned IP address. The network protocol processing system processes all the network packets that have the IP address as the destination address, even though the load balancer of the network protocol processing system of the invention may distribute network packets among different processors.

Figure 9A:
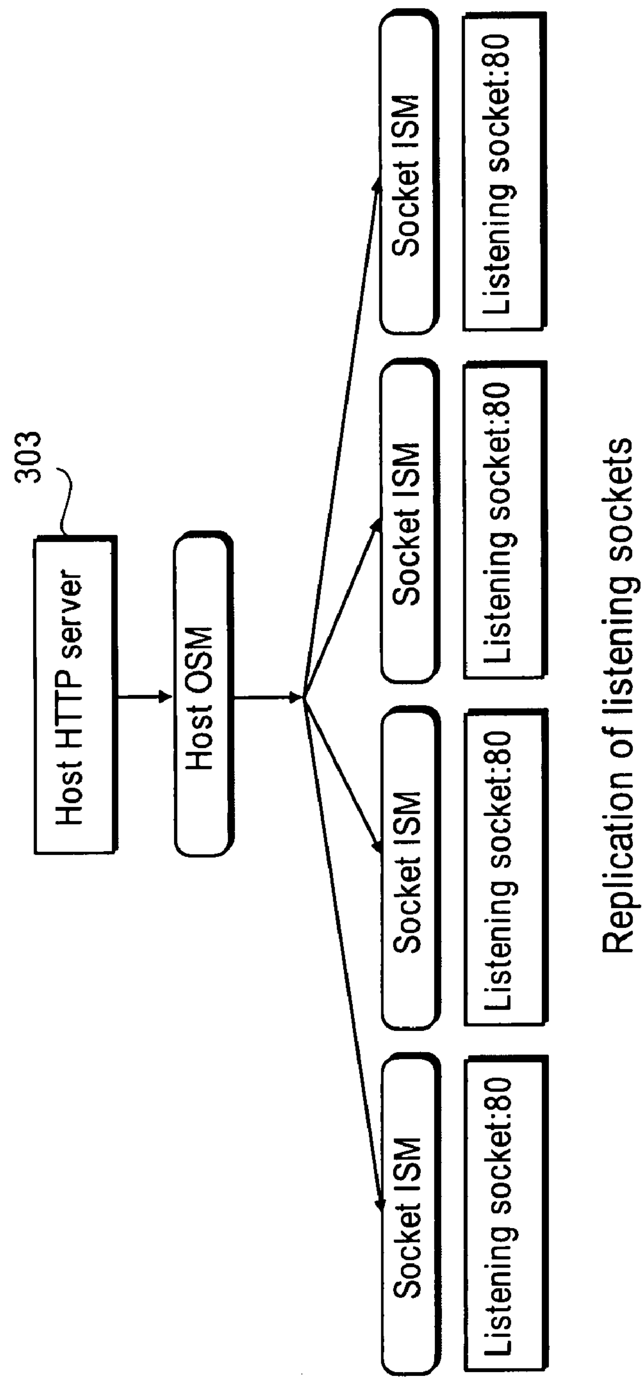
FIG. 9A shows the replication of listening sockets which occurs in one embodiment of the present invention.

From the perspective of the host processor or processors, this single interface is created by replicating listening sockets on the various processors, such as processors 102A, 102B, and 102N of FIG. 6A, in the network protocol processing system of the invention. In the example shown in FIG. 9A, four listening sockets at port 80 are created when the host, in this case a host http server 303, starts. The communication between the host system and the processors in the network protocol processing system is through an OSM/ISM system which follows the I2O architecture, which is described further below. As shown in FIG. 9A, each processor (in this case 4 processors in the network protocol processing system) includes a socket ISM software module and a listening socket at port 80.

Figure 9B:
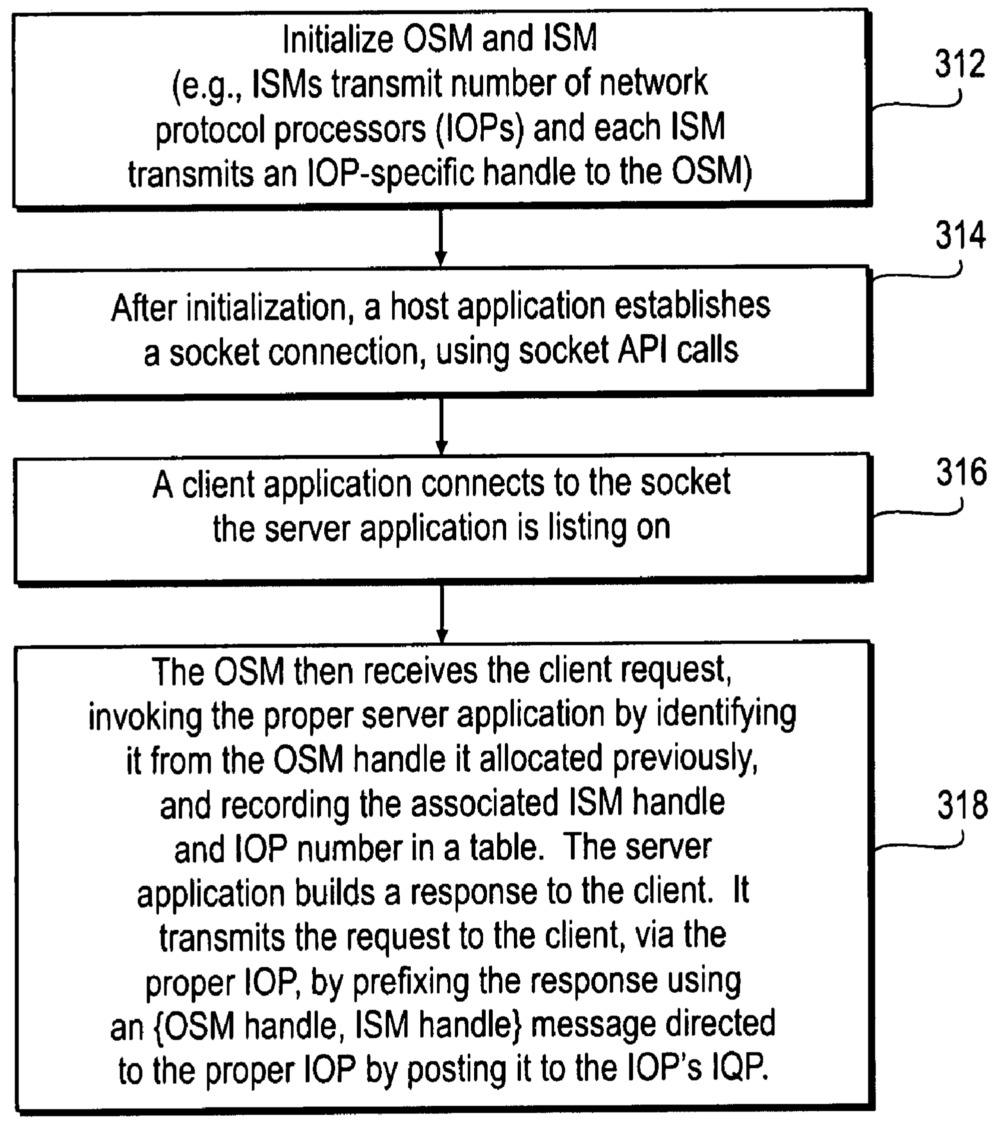
FIG. 9B is a flowchart showing a method of replicating listening sockets.

FIG. 9B shows an exemplary method of replicating sockets to create the architecture shown in FIG. 9A. Operation 312 of FIG. 9B initializes the OSM system on the host and the ISM systems on the processors (IOPs) on the network protocol processing system such as processors 102A, 102B, . . . 102N of FIG. 6A. Each ISM, as part of this initialization in operation 312, transmits a number representing its IOP and transmits a format of an IOP-specific handle to the OSM software executing on a host. Each ISM preallocates a number of handles for its associated IOP (processor) on which it is executing. In operation 314, a host application establishes a socket connection using socket API calls after initialization. This typically involves the OSM informing each ISM that a new host application is bound to a new socket in the listening state by sending an I2O message (in a process described generally below) to each IOP. The message contains an OSM handle which identifies the host socket, and each IOP's ISM causes this association message (socket, host OSM handle) to be recorded in an internal table in memory for the particular IOP. In operation 316, a client application connects to the socket that the server application is listening on. This typically involves a given IOP receiving a connection request, and the ISM executing on this given IOP looks up the socket in its internal memory table to identify the host OSM handle. The ISM then allocates a handle from its pool of available handles and records the association (having a data structure representing: socket, OSM, and ISM handle) in an internal memory table. The ISM sends an I2O message to the OSM which contains the data (OSM handle, ISM handle, IOP number). In operation 318, the OSM then receives the client request, invoking the proper server application by identifying it from the OSM handle it allocated previously, and recording the associated ISM handle and IOP number in a table. The server application also builds a response to the client in the exemplary manner shown in operation 318 of FIG. 9B.

FIG. 10A shows the paths taken in sending data from the host through a network protocol processing system of the invention. In the embodiment shown in FIG. 10A, the network protocol processing system includes 4 separate processors, each executing their own separate network protocol stacks; they are labeled as IOP0, IOP1, IOP2, and IOP3. FIFOs or other buffers are also shown in the data paths such as FIFOs 333A, 337A, and 341A. Further, these data paths include a checksum operation such as checksum operation 335A for processor IOP0. The processing of packets is pipelined through the protocol layers as shown in FIG. 10A for each processor. When the host process attempts to send a message, a socket level message send command is posted to the socket ISM module of the particular processor which is usually, as described below, identified by the OSM module on the host processor or processors. The socket ISM module transfers the message from the host memory into the particular preallocated memory of the particular processor, such as processor IOP0. In the example shown in FIG. 6B, this may involve a DMA operation from the host memory 121 to dedicated memory which is coupled to the system 115, such as memory 111. The socket ISM module of the particular processor designated as the target processor also invokes the transfer protocol processing such as TCP. The transport processes form datagrams in compliance to the protocol requirements and checksum operations are performed as shown by operations 335A, 335B, 335C, and 335N for the respective processors 331A, 331B, 331C, and 331N. Typically at the same time as the checksum operation, the transport process in the transport layer makes a request for route selection and for the resolution of the link address if hardware assisted routing table 168 and the ARP cache 166 are supported. The process continues in the IP layer to processing operations 339 in the case of processor IOP0. After the processing in the IP layer, the datagrams are passed to the Ethernet controller where Ethernet frames are formed and passed through the Ethernet interface 105A as shown in FIG. 10A.

FIG. 10B shows the processing of packets received from the network through the various layers of FIG. 10B. As with FIG. 10A, the embodiment shown in FIG. 10B of a network protocol processing system of the invention includes 4 processors, such as processors 102A, 102B, 102C, and 102N of FIG. 7, each of which is executing separate network protocol stacks. These processors are shown in FIG. 10B as processors IOP0, IOP1, 10P2, and IOP3. The processors are executing different software modules in the two different layers (IP layer and transport layer). As shown in FIG. 10B, the network protocol processing system processes the received packets by pipelining the packets through protocol layers. When a network packet is received from the network medium interface, such as the MAC interface 105A, the interface validates the packet and filters out packets that are corrupted or have wrong addresses. The validation process may include the computation of the IP header checksum. The interface then allocates a data buffer through a buffer manager 361 and then the data is stored typically through a DMA operation into memory which is typically dedicated offchip memory such as memory 111 of FIG. 6A. A simple dispatching algorithm is used to pass the packet to one of the processors for IP layer processing. This dispatch algorithm has been described above relative to FIG. 8C. After processing in the IP layer, the packet is passed up to the transport layer. As noted above, for connection oriented protocols such as TCP, all packets belonging to the same session are dedicated to the same processor where the session was started. Even though different processors may process IP packets belonging to the same TCP session, they are typically directed to the same processor for TCP processing. After the TCP layer has completed its operations, the packet is passed to the socket ISM module for the particular processor which then sets up the DMA operations for delivering the packet data to host memory for processing by the host processor.

Figure 11B:
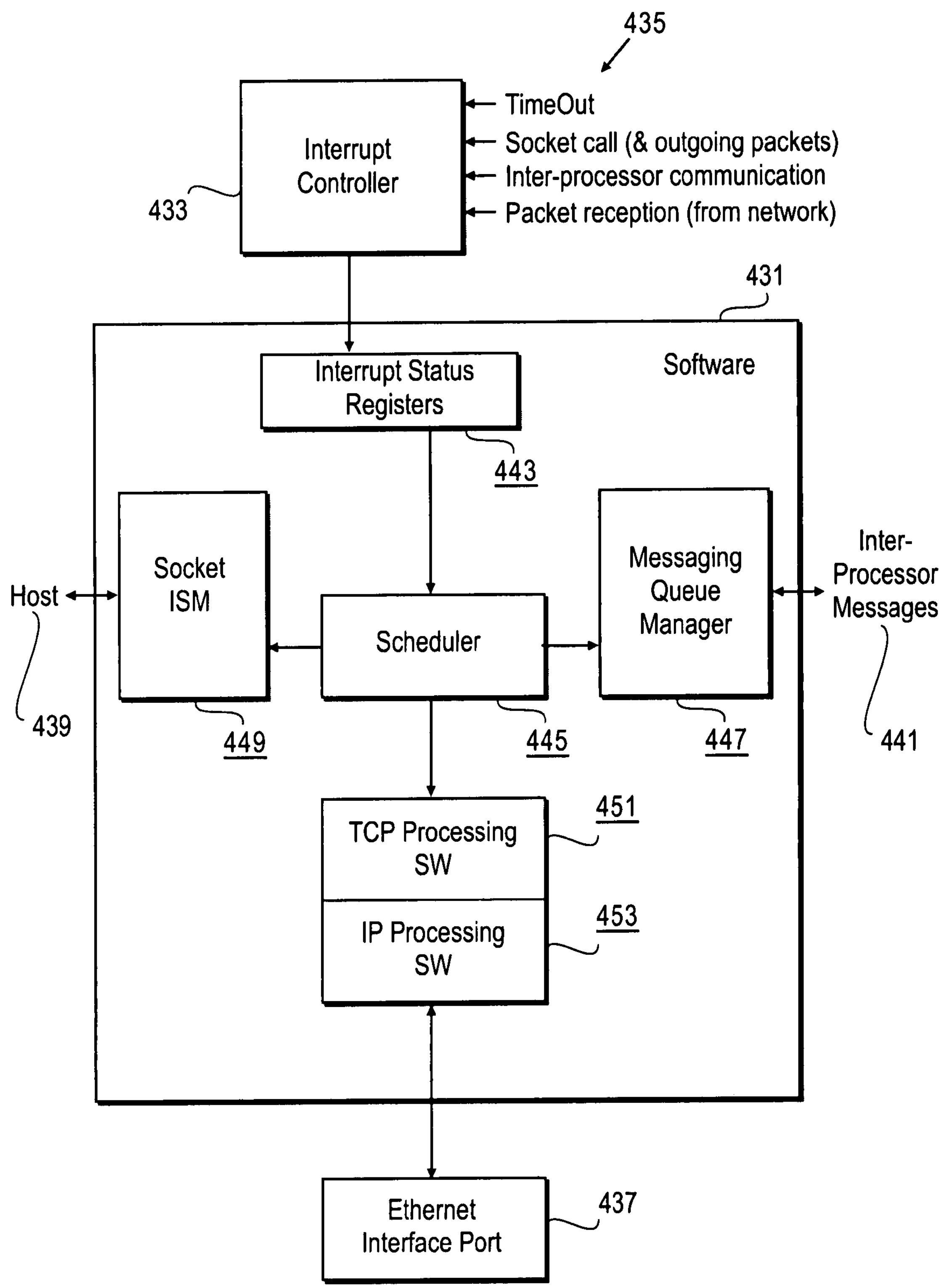
FIG. 11B shows another architecture model for a software component of one embodiment of the present invention.

FIGS. 11A and 11B show exemplary architectures for the "net kernel" software which is executing on each processor, such as processors 102A, 102B, and 102N of a network protocol processing system such as the system 101 of FIG. 6A. The software and associated data structure for each processor is represented by blocks 401A, 401B, and 401N respectively, for the processors 102A, 102B, and 102N of the system 101 of FIG. 6A. The executing software in each processor may communicate through the bus 103 with other executing software in order to perform load balancing and memory management. Each of the processors runs its own instance of net kernel which includes an operating system and the protocol stack. Each instance of net kernel has its private resources such as memory (e.g. a preallocated portion of the memory 111 which is coupled to the system 101 as shown in FIG. 6A). However, the processors share resources such as the interface to the host and the interface to the communication medium such as an Ethernet communication medium. As shown in FIG. 11A, each instance of the net kernel executing on each processor includes its own network protocol stack 403A or 403B or 403N. Further, each instance of the net kernel includes its own copy of an interprocessor communication module 409A, or 409B, or 409N which facilitates communication among processors. A variety of services can be supported on top of the interprocessor communication module such as distributed lock management 407A, or 407B, or 407N, or load balancing, such as load balancing 411A, 411B, or 411N, and/or global memory management such as GMM 405A, 405B, or 405N. The operating system portion of the net kernel also includes an I2O ISM module which facilitates the communication with the host processor or processors as is described further below (e.g. see the discussion associated with FIG. 13). This ISM module in each net kernel of each processor communicates with the OSM module operating on the host processor in order to communicate messages and commands between each processor and the host processor in order to perform various operations such as DMA operations between the network protocol processing system's memory (e.g. memory 111 of FIG. 6A) and the host's memory (e.g. memory 121 as shown in FIG. 6B). The protocol stack in one embodiment which is being executed by each processor in the network protocol processing system may, in one embodiment, be a TCP/IP protocol stack which is a conventional TCP/IP protocol stack which runs on top of the net kernel's operating system and interoperates with the I2O ISM software module of each processor.

FIG. 11B shows in further detail the net kernel software being executed by each processor, such as processor 102A of FIG. 6A. The net kernel software 431 includes a scheduler module 445 as well as the processor's socket ISM module 449 for communication with the host 439. The net kernel software 431 also includes a messaging queue manager 447 which manages the interprocessor messages 441 as part of the interprocessor communication through bus 103 as shown in FIG. 11A. The software 431 further includes, in this embodiment, TCP processing software as well as IP processing software 451 and 453, respectively. The network protocol processing software is in communication with, in this case, a network communication port which is an Ethernet port 437. The software 431 also maintains interrupt status registers 443 which receive interrupts from the interrupt controller 433 which concentrates interrupts 435 from various interrupt sources including the timeout timers, socket calls from the host and outgoing packets from the host, interrupts from other processors for interprocessor communication, and interrupts generated by the dispatch logic (e.g. dispatch logic 106 in the case of packet reception from the network). The operating system portion of the net kernel software 431 provides basic functions such as scheduling and dispatching, memory management, timing services, thread management, synchronization, and system initialization. It supports execution at two levels, interrupts and threads, and the execution priorities are such that interrupts, unless disabled, are processed with the highest priority. High priority threads have the second highest priority and such threads are not destroyed. Instead they are blocked on return and reentered when subsequently resumed. Normal or low priority threads may be preempted by either the interrupts or the higher priority threads. Normal or low priority threads are terminated when they complete and thus, if necessary, should be written as a function that runs forever. In one embodiment, the net kernel performs all network protocol processing at the interrupt level in order to minimize context switching. The net kernel also polls the Ethernet MAC interface (or other network communication medium interface) as well as the DMA interface to the processor's memory (e.g. memory 111 of FIG. 6A) or to the host's memory.

Figure 12A:
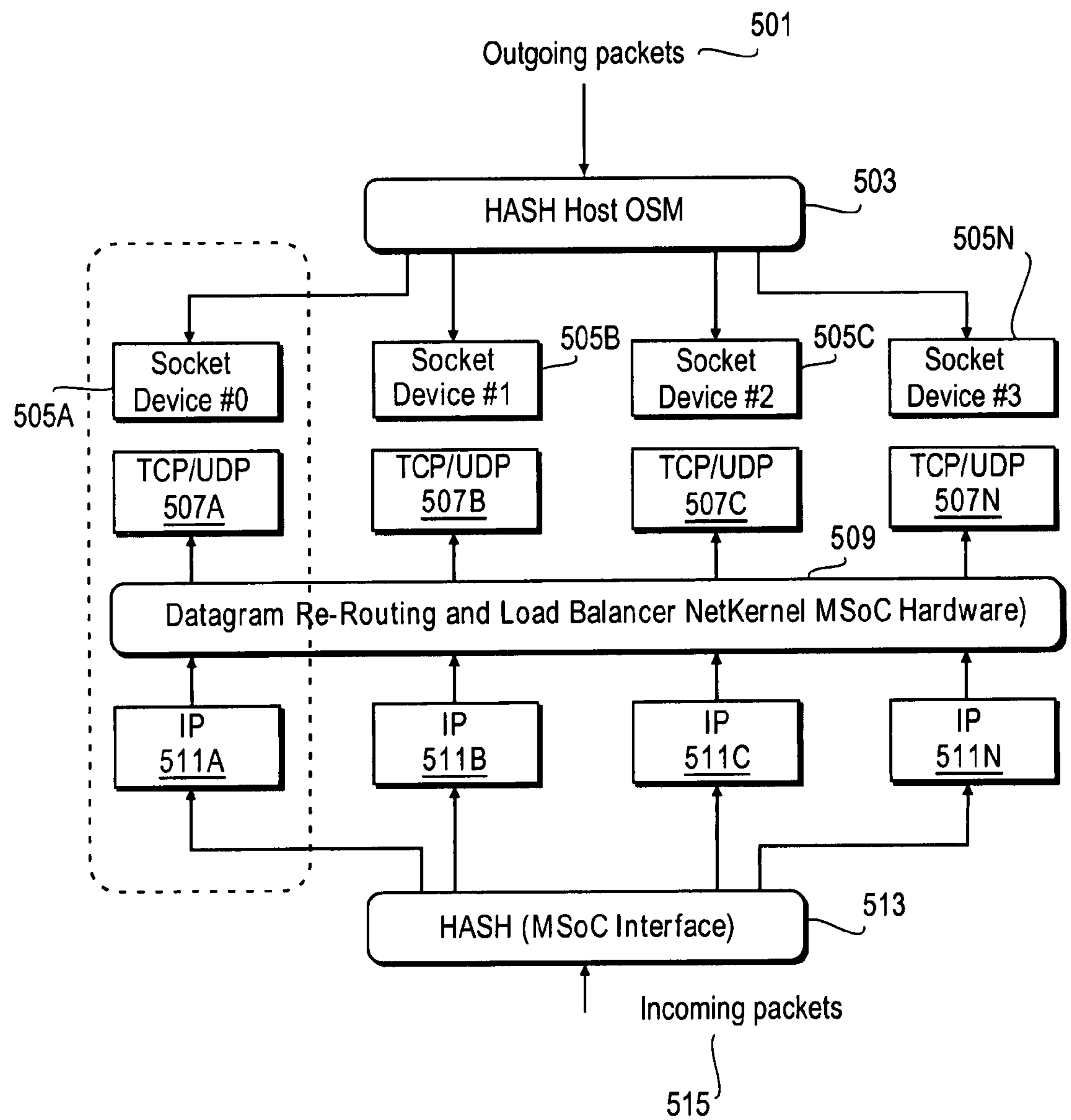
FIG. 12A illustrates one exemplary method for performing packet flows for load balancing.

FIG. 12A shows an example of a method of load balancing of the packet flows through 4 processors of a network protocol processing system such as the system 101. The host OSM module 503 controls the distribution of outgoing packets 501 to one of the four processors, each of which are shown in FIG. 12A as having separate sockets (as in the case of FIG. 9); the sockets of FIG. 12A are shown as 505A, 505B, 505C, and 505N. The host OSM module remembers for a session the particular processor which processed the incoming packets which are being responded to by the outgoing packets 501. The host OSM will recall for this session the identification of the particular processor and forward the outgoing packets to that processor. The host OSM typically employs a tag for each session which identifies the particular processor in the network protocol processing system. If there is no tag (e.g. in the case where the server initiates a session) then the host OSM will provide a tag to identify the particular processor in the network protocol processing system to process the outgoing packet. However, processing at the IP layer (blocks 511A, 511B, 511C, or 511N) may be performed by any one of the available processors in the network protocol processing system. Furthermore, datagrams originating from connectionless protocols such as UDP and IGMP can be processed by any one of the executing network protocol stacks. Incoming packets 515 are hashed in a hashing operation 513 which may be performed by simple programmable hardware logic that dispatches received IP packets to one of the 4 processors for processing of the IP protocol in blocks 511A, 511B, 511C, or 511N. After the IP layer processing, the transport protocol header of the IP packet is examined. If the datagram belongs to connection oriented protocol such as a TCP protocol, a software hash function may route the datagram to the correct processor 507 for transport protocol processing. Thus all datagrams belonging to a TCP session are restricted to be handled by the same processor where the session was initiated or opened. On the other hand, if the datagram is not specific to a connection (e.g. a connectionless protocol) then the datagram may be rerouted in order to balance the load by the load balancing module 509.

FIG. 12B shows a further example of the direction of packets based on address hashing and load balancing. The hash function 533 examines the source IP and source port number 531 and determines, in the case of non-fragmented packets, the proper processor which is selected to process the packet pursuant to a network protocol. In the case shown in FIG. 12B, the processor selected by the hash function 533 is the processor P0, but as shown in FIG. 12B, the processor P0 determines in operation 535 that its processing queue is too large and forwards an interprocessor communication request to another processor, in this case P2 539, to process the packet. Message queues are maintained between the processors, such as message queue 537 between processor P0 and processor P2 and message queue 547 between processor P1 545 and processor P0. The hash function 533 is typically an exclusive OR which produces two bits to select a processor in the case where the network processing system includes 4 processors such as processors 102A, 102B, 102C and 102N as shown in FIG. 7. The hash function 543 is a different hash function which is employed for fragmented packets. In this case the IP identifier which identifies the session causes, through the hash function 543, the packet fragment to be directed to the same processor as prior fragmented packets having the same IP identifier. It can be seen from FIG. 12B that fragmented packets 541 are processed through the hash function 543 and forwarded to processor P1 for processing. The processor P1 may indicate through its software message queue 547 that it is busy, which causes the processor P0 to forward packets it receives to processor P2 instead of processor P1.

A description of the OSM and ISM modules in the I2O architecture will now be provided while referring to FIG. 13. In the following discussion, it is assumed that the I2O architecture with OSM and ISM modules are used to control the communication between the network protocol processing system, such as system 101, and a host processor 561; it will be appreciated, however, that alternative architectures may be employed. Communication between a network protocol processing system such as system 101 which includes multiple processors, each executing a separate network protocol stack as a separate thread, and a host processor or processors is based on the I2O socket architecture which defines a messaging framework for two systems to exchange information with each other. This architecture is well known and was developed by the I2O special interest group. Detailed information regarding this architecture can be found at the I2O web site which is www.intelligent-IO.com. To support the I2O socket architecture, a socket ISM module is running at the top of the protocol stack on each processor. The ISM module interacts with a host OSM module, intercepts all the socket calls, maintains and manages data structures for socket operations, and controls the data moving into and from the host. A socket layer in each ISM of each processor in a network protocol processing system provides an interface (API—application program interface) used by applications running on the host processor to access TCP/IP services. The OSM and ISM provide the communication between the socket API and the network protocol stack. TCP or UDP sockets are maintained and synchronized between the host and each processor. A set of message queues is managed by the ISM modules and the host OSM module as shown in FIG. 13. For each processor in a network protocol processing system, there is a corresponding inbound free queue and an inbound post queue. In the case shown in FIG. 13, there are 4 processors in the network protocol processing system (and thus the system of FIG. 13 resembles the embodiment shown in FIG. 7 which includes 4 processors 102A, 102B, 102C, and 102N). ISM module 567A is executing on processor P0 while ISM modules 567B, 567C, and 567D are executing respectively on processors P1, P2, and P3. The ISM's of the 4 processors jointly control, as represented by the block 569, the outbound free queue 571 and the outbound post queue 573 which allows for the transmission of messages to the host OSM from any one of the ISMs executing on one of the processors. Processor P0 has its corresponding inbound free queues and inbound post queues 563A and 565A, and each of the processors P1, P2, and P3 have their respective inbound free queues and inbound post queues (563B, 565B, 563C, 565C, 563N, and 565N). Each queue may contain a plurality of message frame addresses which are pointers to a memory address that contains a message that needs to be processed. In the case of the outbound free queue 571 and the outbound post queue 573, these message frame addresses are pointers to locations in the host's memory. In the case of the other queues shown in FIG. 13 (563A, 563B, 563C, 563N, 565A, 565B, 565C, and 565N), these message frame addresses are pointers to memory locations of the corresponding processor's memory such as preallocated memory portions of the memory 111 of FIG. 6A. When the OSM host has a message to communicate to a particular processor, such as processor P0, the OSM host determines whether the processor's corresponding inbound free queue (e.g. queue 563A in the case of processor P0) has a free entry, and if so the inbound free queue provides a free MFA (message frame address) to the OSM host and the OSM host then causes a DMA operation to occur, typically from the host's memory (e.g. memory 121 of FIG. 6B) to a preallocated portion of the network protocol processing system's memory, such as the memory 111. When the DMA operation is complete, the OSM host posts the MFA address in the corresponding inbound post queue for that processor (e.g. queue 565A for processor P0) and this queue can then interrupt its corresponding processor or its processor can poll the queue to see if there are any messages to process. A similar sequence of operations occurs in the reverse direction when an ISM module on a particular processor seeks to send a message or communicate data to the host OSM. In this case, the particular ISM module asks the outbound free queue whether there are any available MFAs, and if so, the outbound free queue 571 provides an available MFA to the requesting ISM, which in turn causes a DMA operation to transmit data from the processor's memory (e.g. a preallocated portion of the memory 111) to the host's memory. After the DMA operation is complete, the particular ISM posts the MFA in the outbound post queue 573 which can cause an interrupt of the host processor or the host processor can poll the queue to see if there are messages to process. It will be appreciated that the information which is exchanged in this architecture can include either data or commands which can be interpreted upon receipt to cause a particular action or a combination of data and commands.

The OSM typically intercepts all socket API calls and converts them into messages for an ISM module. For example, as a result of a send call, the OSM would buffer the data to be sent and send a message to the appropriate ISM and wait for the appropriate ISM to confirm that the DMA data transfer for its corresponding processor has been completed. The OSM module on the host also receives all messages arriving from any one of the ISMs and acts upon them. For example, a message may indicate that there is data for socket X in buffers B1 and B2, and the OSM would deliver the data to the application waiting on socket X, and then notify the ISM module that buffers B1 and B2 are now free. The ISM on a particular processor processes incoming messages from the OSM and converts them into actions. For example, upon receiving a send message from the OSM, the ISM would set up a DMA operation to pull the data into the processor or the processor's memory and route the data to the appropriate socket for subsequent processing by the TCP/IP protocol stack, and on completion, inform the OSM accordingly. When incoming data arrives for socket X, the ISM transfers the data, via DMA, into a free receive buffer on the host. The ISM then notifies the OSM that the new data for socket X is available in a particular buffer.

Figure 14:
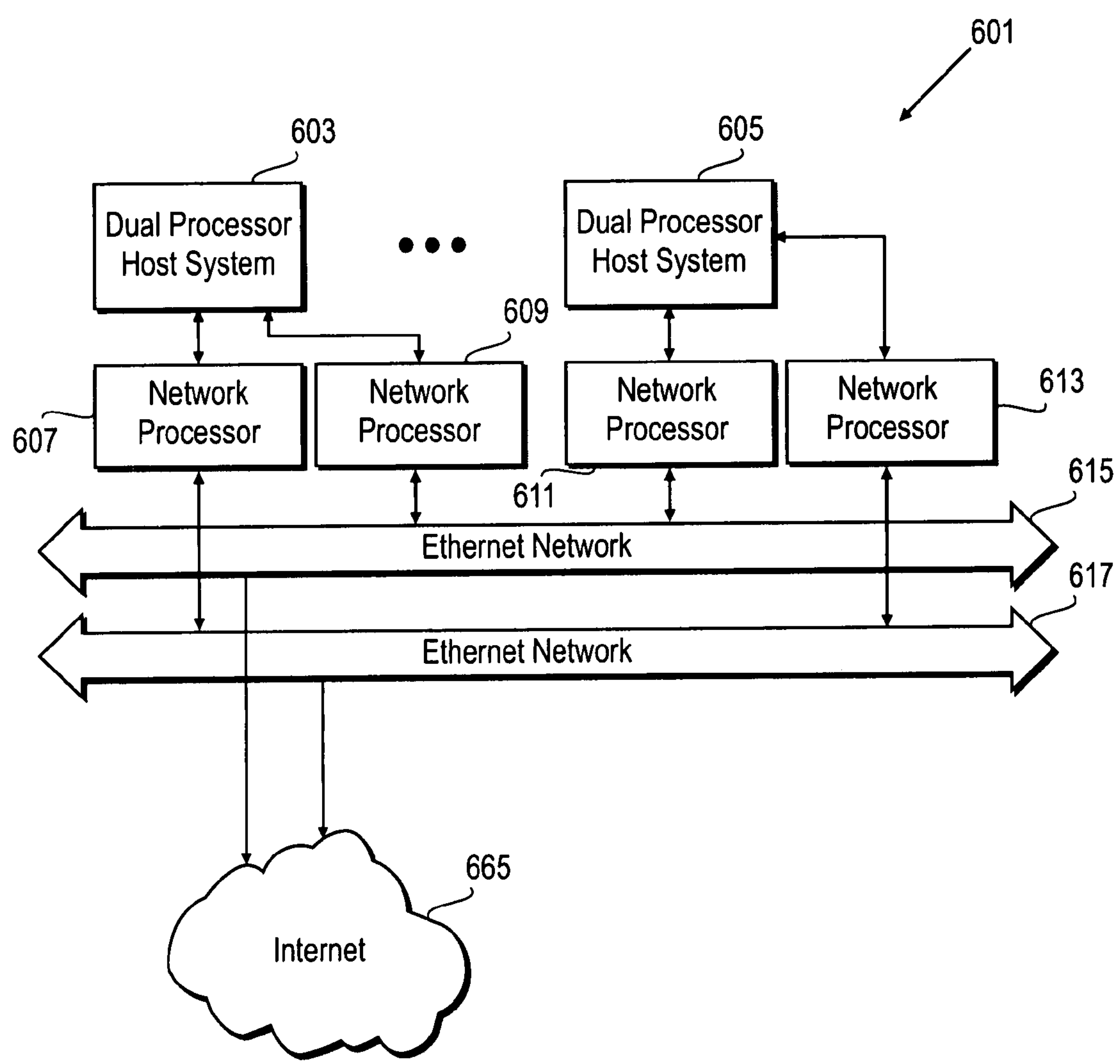
FIG. 14 shows the architecture of a processing site, such as a web site, according to one embodiment of the present invention.

FIG. 14 shows an example of, in one case, a server farm which includes two dual processing systems 603 and 605, each of which has two network processors of the present invention coupled to it. In particular, the system 601 has a dual processor host system 603 which is coupled to two network protocol processing systems of the present invention. Each of these network protocol processors 607 and 609 may have the architecture shown in FIG. 6A and include dedicated off-chip memory such as memory 111 for each network processor. Similarly, the dual processor host system 605 has two separate network protocol processors 611 and 613 which may each be similar to the architecture shown in FIG. 6A. Each processor of the dual processor host system may be dedicated to one of the two network processors which is coupled to the dual processor system. In this case, the network processor interfaces with only a single host and the architecture is similar to that shown in FIG. 6B. Each network processor is coupled to a particular Ethernet network, either network 615 or 617 as shown in FIG. 14. This provides for potentially increased bandwidth and also increased reliability should one of the networks fail for some period of time. It will be appreciated that the system 601 may function as a web server or other type of server when the Ethernet network 615 and 617 are coupled to another network, such as the Internet 665.

Figure 15:
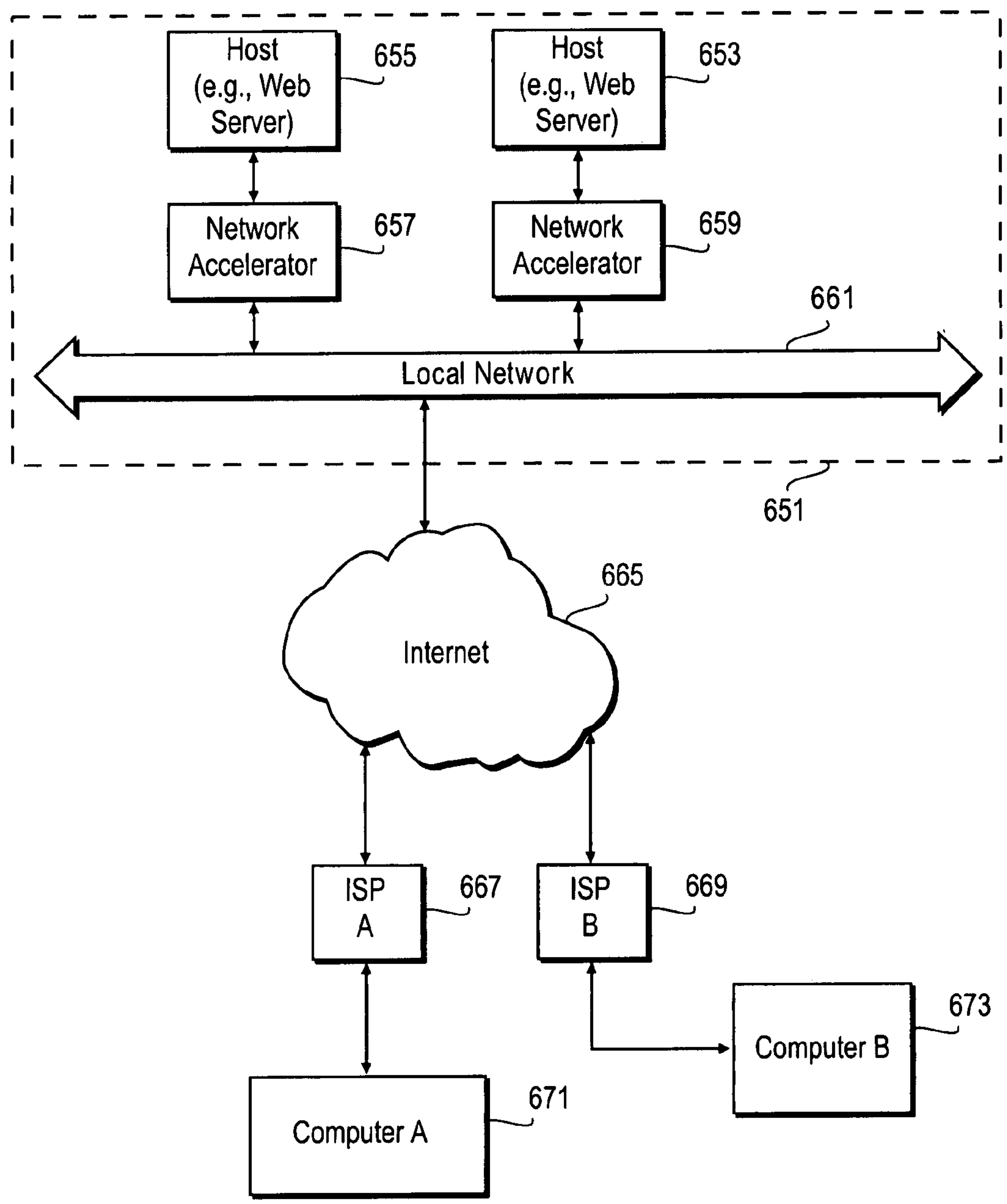
FIG. 15 shows a further example of a web site according to the present invention in conjunction with the Internet and other processing systems.

FIG. 15 shows an alternative architecture for a web site 651 which includes two host systems which are serving as web servers 655 and 653, each of which includes a network accelerator 657 and 659 respectively. The host systems are coupled through the network accelerators to a local network 661 which in one embodiment may be an Ethernet network. In turn, this network 661 is coupled to the Internet 665. Each network accelerator 657 and 659 may be of the architecture shown in FIG. 6A and have multiple processors, each processing separate network protocol processing stacks. This would allow the same network accelerator to process web sessions between two different "client" computers, such as computers 671 and 673, which are coupled to the Internet 665 through two different Internet service providers 667 and 669. It will be appreciated that the combination of the host system 655 and the network accelerator 657 may resemble the architecture shown in FIG. 6B which allows for the different sessions to be processed by the same network accelerator through two different network protocol stacks for the same network interface 105.

Figure 16A:
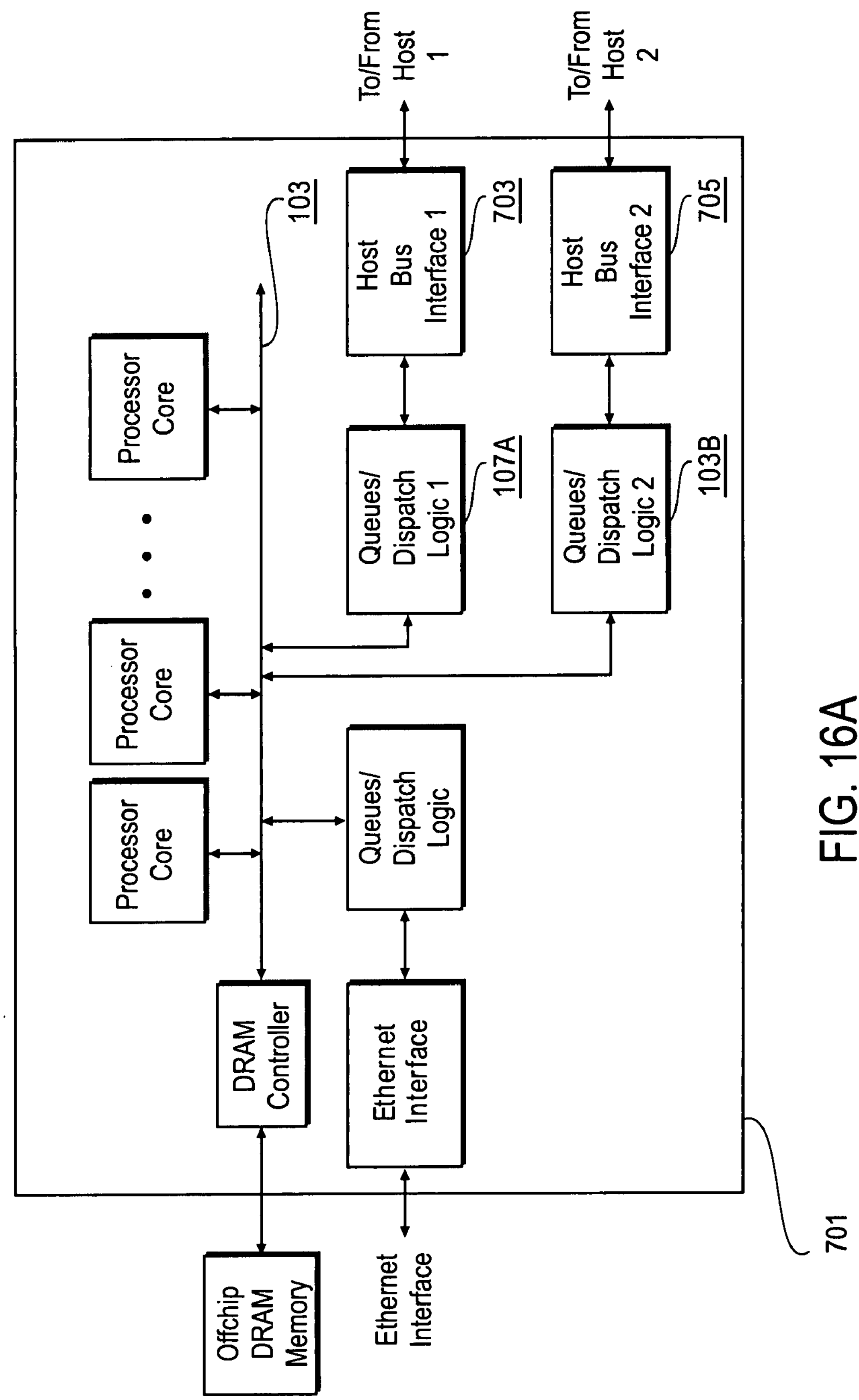
FIG. 16A shows a block diagram of another embodiment of a network protocol processor system.
Figure 16B:
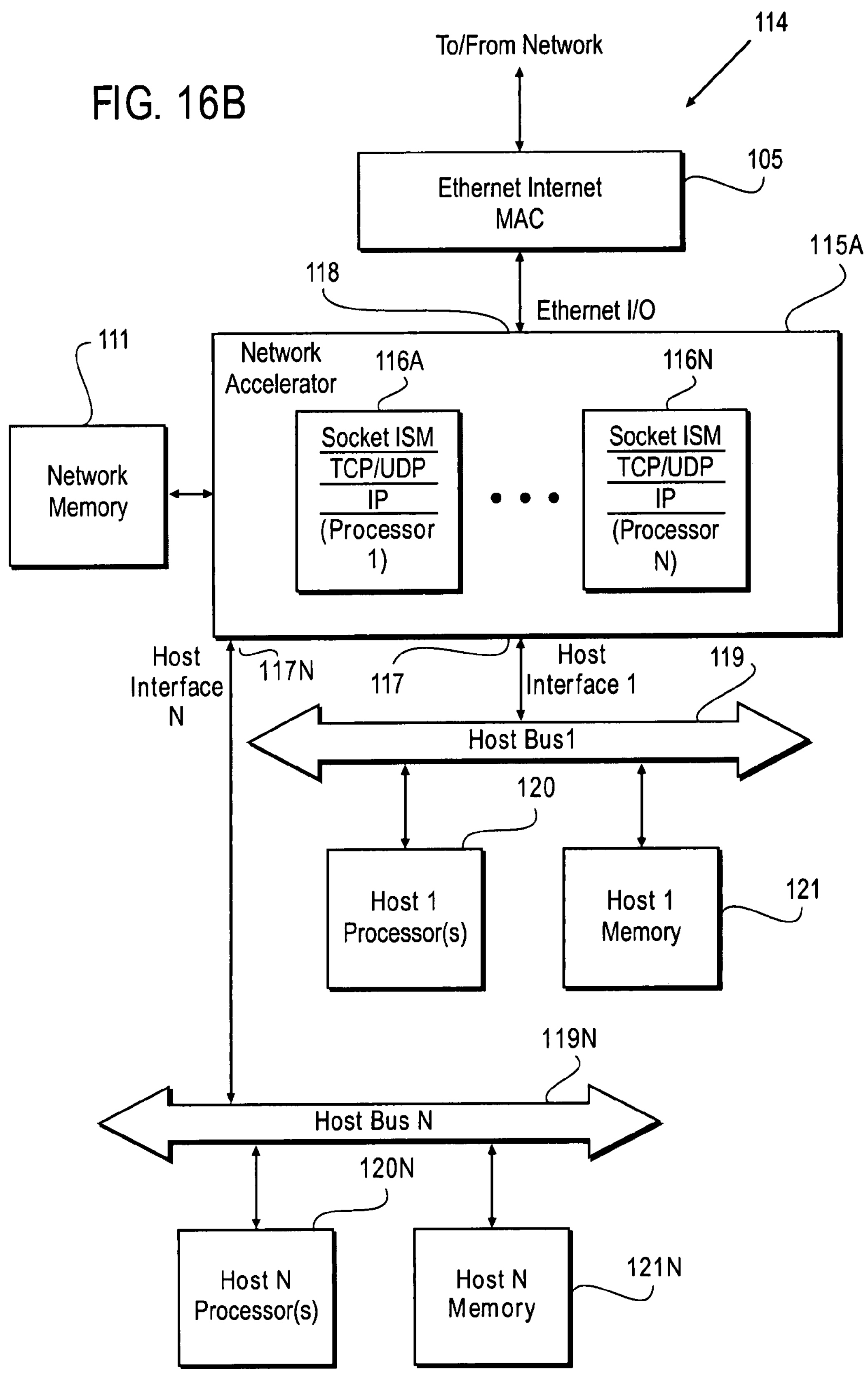
FIG. 16B shows a part software/part hardware architecture in which a network protocol processor has interfaces to at least two host systems.
Figure 16C:
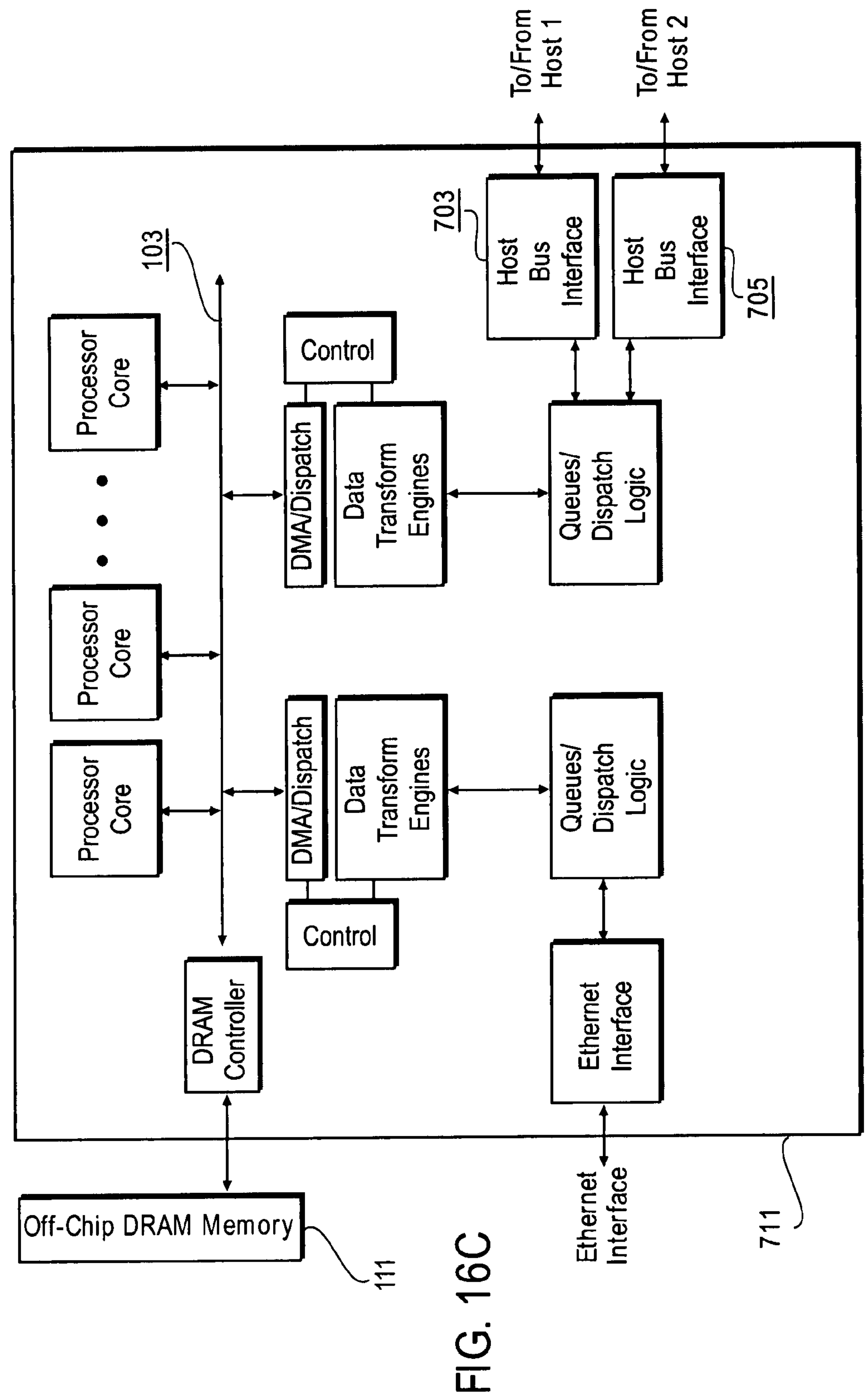
FIG. 16C shows another block diagram of another embodiment of a network protocol processor system.
Figure 16D:
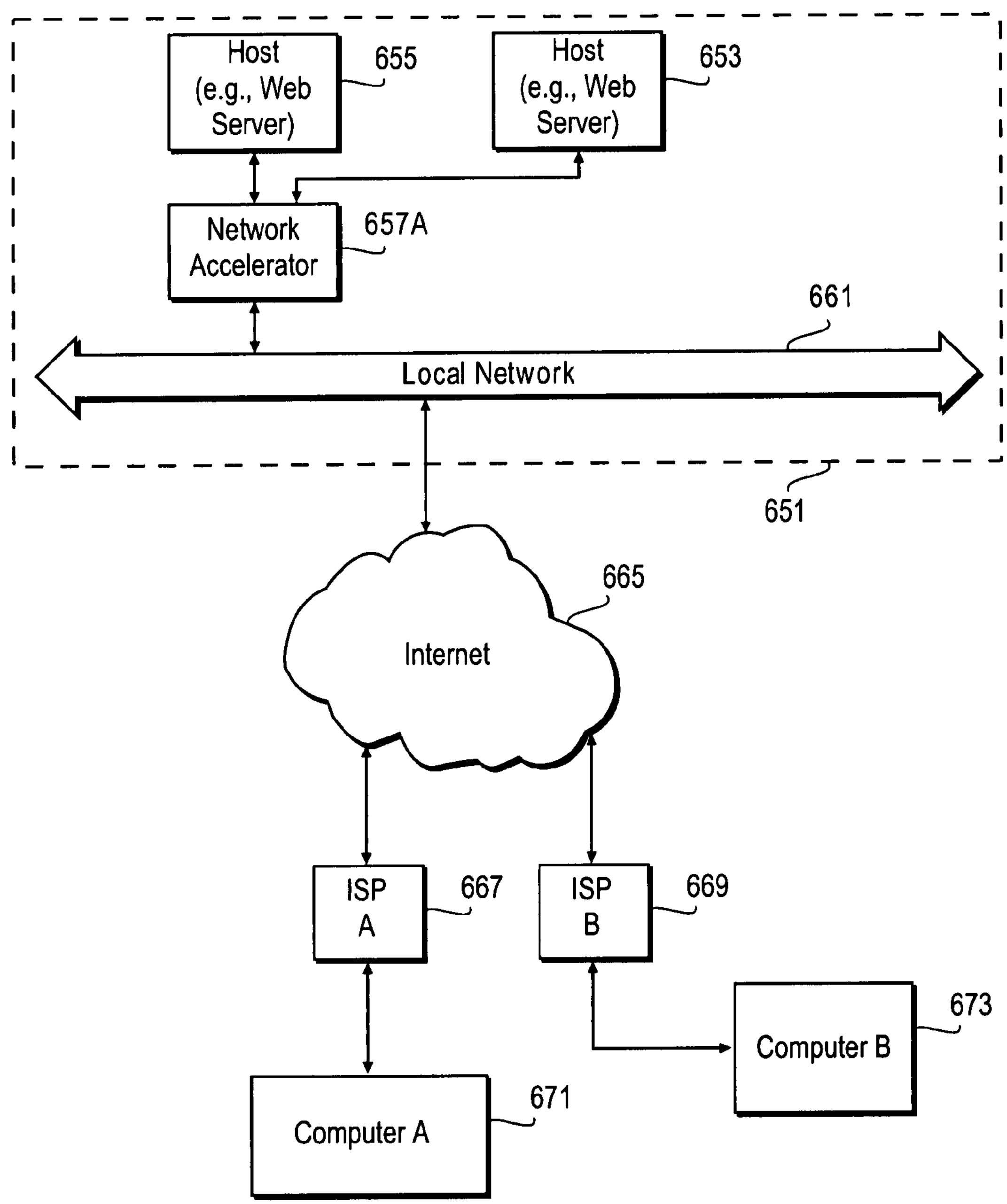
FIG. 16D shows a further example of a web site which may use an embodiment of the present invention.

It will be appreciated that various modifications may be made to the concepts of the present invention to produce alternative embodiments. One such alternative embodiment is shown in FIGS. 16A, 16B, 16C, and 16D. In this alternative embodiment, a network protocol processing system includes more than one host bus interface which allows the network protocol processing system to communicate with more than one host. In the embodiment shown in these figures, a single network interface, such as an Ethernet interface, may be used with multiple host bus interfaces. Alternatively, more than one network interface may be used in combination with more than one host bus interface. FIG. 16A shows an example, in block diagram form, of a network protocol processing system with more than one host bus interface. This architecture is a variation of the system shown in FIG. 6A which has a single host bus interface. The architecture of FIG. 16A includes a host bus interface 703 for communicating with a host 1 and a host bus interface 705 for communicating with a host 2. The system 701 shown in FIG. 16A may be implemented as a multiple integrated circuit system or on a single integrated circuit. The architecture of FIG. 16A allows a single network protocol processing system, such as system 701, to be connected to more than one host system as is shown in FIG. 16B. It will be appreciated that the architecture shown in FIG. 16B is similar to the architecture shown in FIG. 6B except that the host system 115A has several host interfaces, such as host interface 117 and 117N coupled to 2 different host systems, each having their own host bus 119 and 119N. As is shown in FIG. 16B, each host bus includes a host processor and host memory, such as host processor 120N and host memory 121N. This capability to allow communication with more than one host can be useful when the processing throughput of a single network protocol processing system is more than the capacity of a single host system to respond, and thus a single network protocol processing system can be connected to two or more host systems. This ability to connect a single network protocol processing system to multiple host systems, such as computer systems, can also be used for achieving high availability through the use of redundant host systems. In the event of a failure by one host, a second host is used to take over the operation of the first host which failed. The multiple host architecture of FIG. 16A can also be used in conjunction with the data transform engines that are placed serially in the data flow to the host, such as the data transform engines shown in FIG. 6C and described in conjunction with FIG. 6C. FIG. 16C shows an example of such a multiple host architecture which uses data transform engines. The benefits of eliminating a pair of memory accesses for transformations apply equally well to the multiple host interface architecture of FIG. 16C. FIG. 16D shows an implementation of a web site or other processing site which uses a network accelerator, such as the accelerator 701 (alternatively referred to as the network protocol processing system 701). In particular, the network accelerator 657A may use the architecture shown in FIG. 16A to provide connectivity for multiple hosts through a local area network 661 as shown in FIG. 16D. It will be appreciated that the architecture shown in FIG. 16D is similar to the architecture shown in FIG. 15.

In one particular embodiment of a multiple host bus interface, such as the system shown in FIG. 16A, each host bus interface would replicate the logic shown in FIG. 13 in order to provide sufficient functionality in an I2O system. The software and operating system required to support a network protocol processing system which communicates with multiple hosts will be similar to the software and operating system of a comparable device with a single host interface, with an additional handle on the ISM to identify the host. The flowchart in FIG. 9B which explains socket replication shows the assignment of a message (socket, host OSM handle) for a network protocol processing system with a single host interface. For a network protocol processing system with multiple host interfaces, such as the system shown in FIG. 16A, the (host OSM handle) message will include the host number. Host (e.g. server) initiated transfers are done in the same way for both the single and multiple host architectures (e.g. the architecture of FIG. 6A and the architecture of FIG. 16A). Remote (e.g. client) initiated transfers are received by the appropriate processor and sent to the appropriate host based on the host number field in the (host OSM handle) data structure.

Figure 17A:
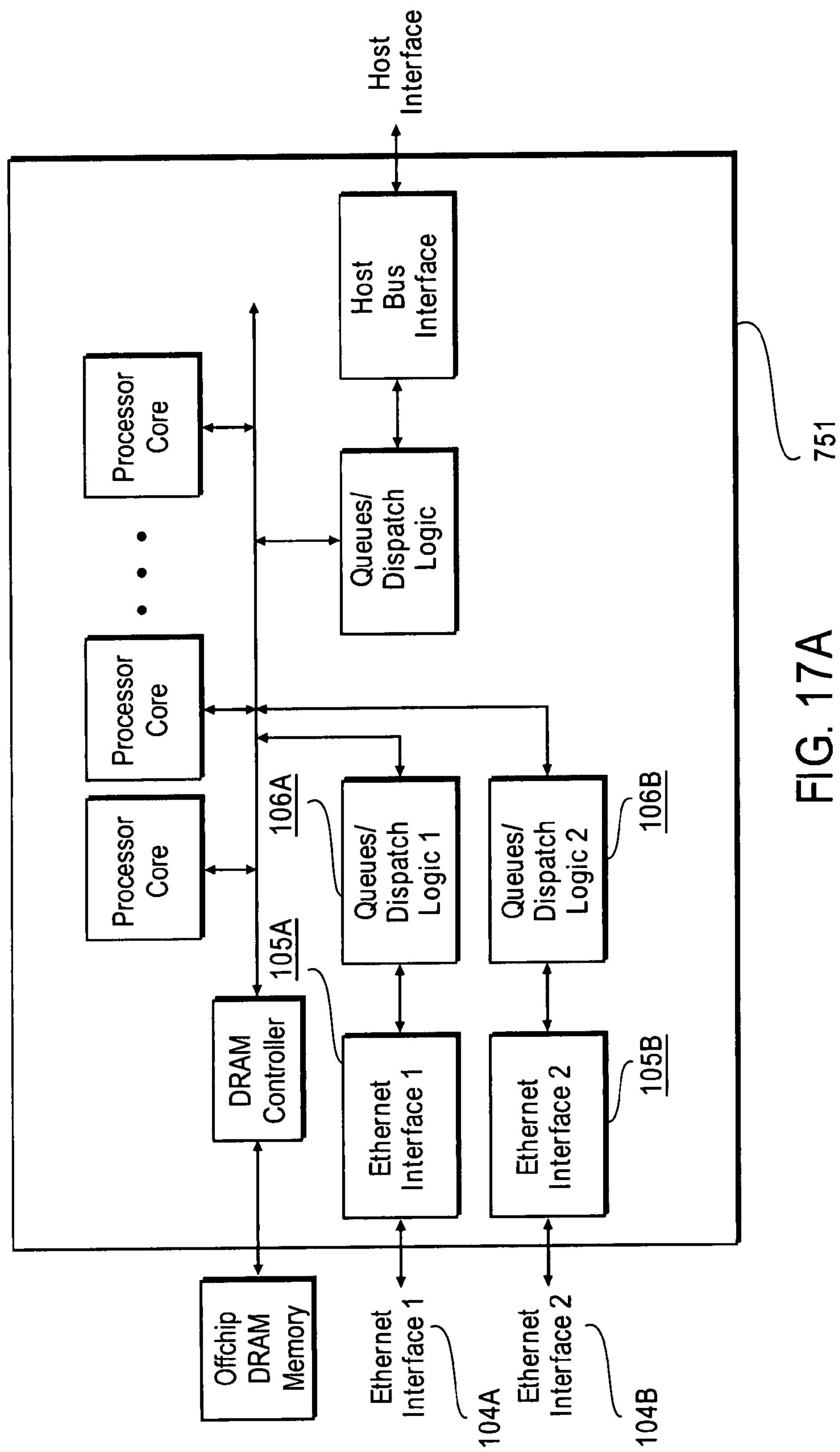
FIG. 17A shows a block diagram of another embodiment of a network protocol processor system which has at least two network interfaces.
Figure 17B:
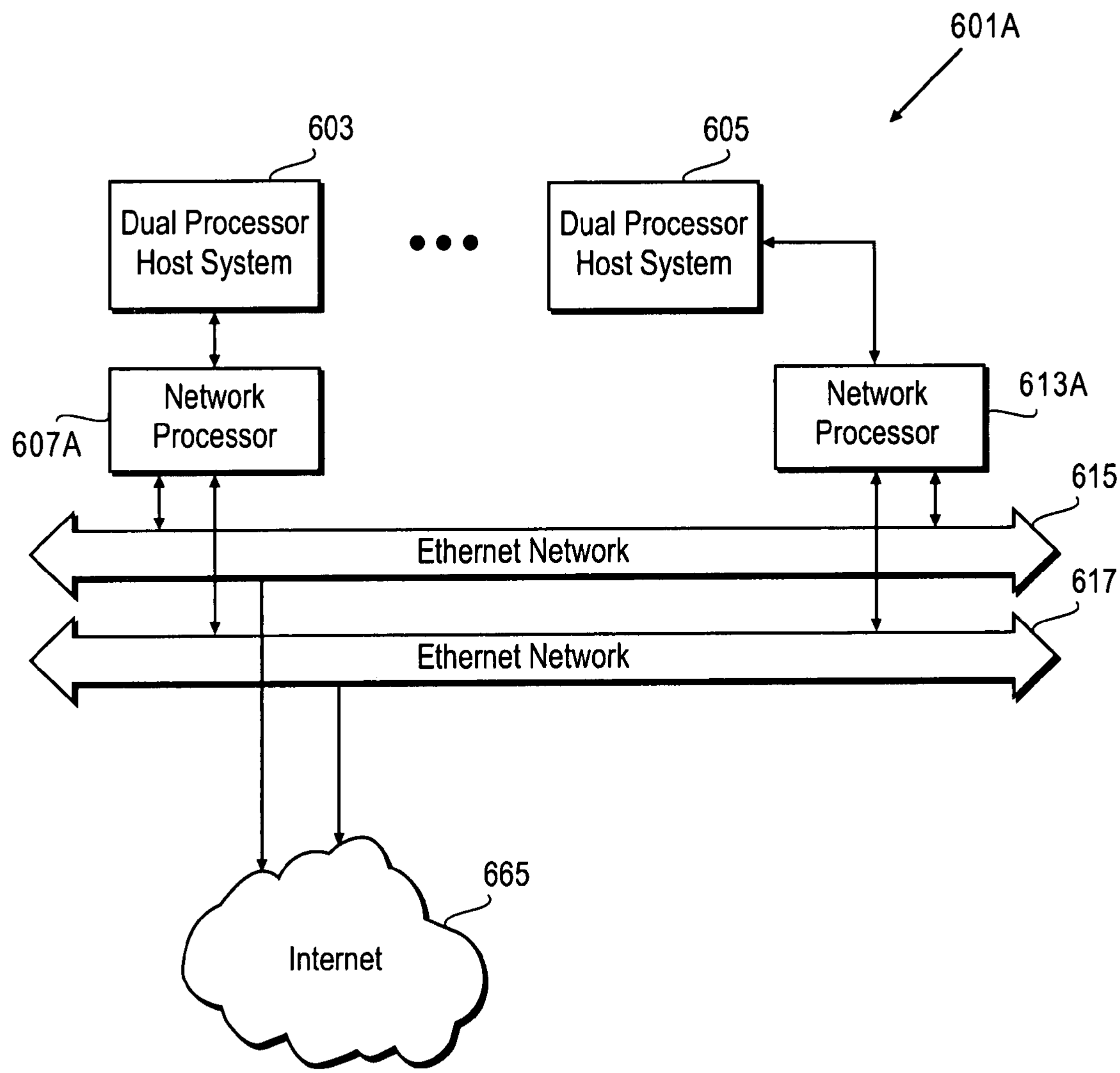
FIG. 17B shows an architecture of a processing site, such as a web site, according to another embodiment of the invention.
Figure 17C:
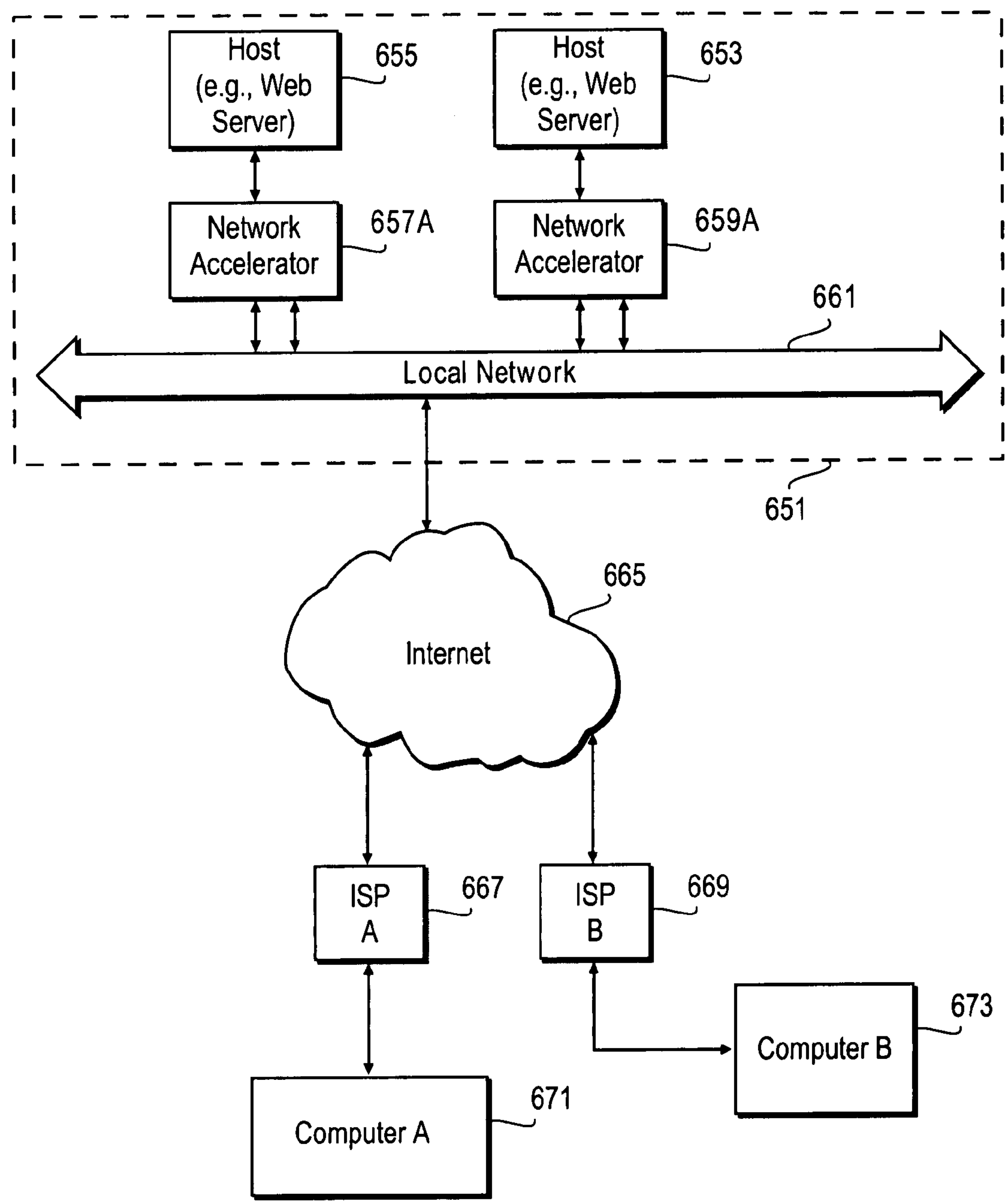
FIG. 17C shows a further example of a web site which may use an embodiment of the present invention.

FIGS. 17A, 17B and 17C show yet another embodiment of the present invention. In particular, FIG. 17A shows a network protocol processing system 751 which is similar to the system shown in FIG. 6A except that two network interfaces are provided by the system 751. In particular, in the example shown in FIG. 17A, an Ethernet interface 105A and an Ethernet interface 105B are included in the system 751 in order to allow the system 751 to communicate with two Ethernet networks. An example of two Ethernet networks is shown in FIG. 17B in which network processor 607A, which may be of the architecture shown in FIG. 17A, and network processor 613A, which may also be of the architecture shown in FIG. 17A, are coupled to 2 Ethernet networks 615 and 617. It will be appreciated that the system 601A shown in FIG. 17B is similar to the system shown in FIG. 14. FIG. 17C shows a particular example of the use of an architecture such as that shown in FIG. 17A and a processing site, such as a web site 651, which includes a network accelerator 657A and another network accelerator 659A, each of which may have the architecture shown in FIG. 17A. It will be appreciated that FIG. 17C in other respects resembles the system shown in FIG. 15. The software and operating system required to support a network protocol processing system with multiple network interfaces, such as multiple Ethernet interfaces, may be similar to the software and operating system of a comparable device with a single host interface, such as the system shown in FIG. 6A. Inputs to the system are handled by the same software that is used in architecture such as that shown in FIG. 6A. Data outputs require the addition of an interface number to the data structure in the TCP connection session, and this technique is similar to that used on general purpose computers with multiple network interface cards.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of processing data which is communicated over a computer network, said method comprising:

pre-allocating portions of a memory to a first network processing offload processor and a second network processing offload processor;

receiving a first packet header data from a first network interface port, performing a hashing function on said first packet header data to identify said first network processing offload processor and processing only said first packet header's network layer data on said first network processing offload processor;

receiving a second packet header data from said first network interface port, performing said hashing function on said second packet header data to identify said second network processing offload processor and processing only said second packet header's network layer data on said second network processing offload processor;

identifying said second network processing offload processor as responsible for handling a first connection that said first packet is a component of;

identifying said first network processing offload processor as being responsible for handling a second connection that said second packet is a component of;

processing said first packet header data in said second network processing offload processor to executes a first transport layer network protocol stack for said first packet, executing a first socket software program with said second network processing offload processor and transmitting a first application data associated with said first packet header data to a host processing system, wherein said second network processing offload processor communicates with at least one host processor of said host processing system;

processing said second packet header data in said first network processing offload processor to execute a second transport layer network protocol stack, executing a second socket software program with said first network processing offload processor and transmitting a second application data associated with said second packet header data to said host processing system, wherein said first network processing offload processor communicates with at least one host processor of said host processing system;

processing of a third packet header data comprising executing a third socket software program with said first network processing offload processor, receiving a third application data from said host processing system and through execution of said first network processing offload processor preparing said third packet header data and causing said third application data and said third packet header data to be transmitted over said computer network through said first network interface port;

processing of a fourth packet header data comprising executing a fourth socket software program with said second network processing offload processor, receiving a fourth application data from said host processing system and through execution of said second network processing offload processor preparing said fourth packet header data associated with said fourth application data and causing said fourth application data and said fourth packet header data to be transmitted over said computer network through said first network interface port;

synchronizing access to said memory by said first and second network processing offload processors; and maintaining a communication channel between said first network processing offload processor and said second network processing offload processor.

2. A method as in claim 1 wherein said first transport layer network protocol stack and said second transport layer network protocol stack are separate processing threads.

3. A method as in claim 2 wherein said separate processing threads each comprise separate operating system software processing logic.

4. A method as in claim 1 wherein said first transport layer network protocol stack and said second transport layer network protocol stack use the same network protocols.

5. A method as in claim 1 wherein said first network interface port comprises an Ethernet interface.

6. A method as is claim 1 wherein said network layer is IP and said transport layer is TCP.

* * * * *